(12) United States Patent
Carrero Villarroel

(10) Patent No.: US 12,396,827 B2
(45) Date of Patent: Aug. 26, 2025

(54) PROSTHETIC DENTAL SCREW IMPLANT, TIGHTENING TOOL AND COUPLING SYSTEM BETWEEN THE TWO

(71) Applicant: TECH XIKA PTT, S.L., Lleida (ES)

(72) Inventor: Xavier Carrero Villarroel, Lleida (ES)

(73) Assignee: TECH XIKA PTT, S.L., Lleida (ES)

( * ) Notice: Subject to any disclaimer, the term of this patent is extended or adjusted under 35 U.S.C. 154(b) by 614 days.

(21) Appl. No.: 17/625,459

(22) PCT Filed: Jul. 9, 2020

(86) PCT No.: PCT/EP2020/069373
§ 371 (c)(1),
(2) Date: Jan. 7, 2022

(87) PCT Pub. No.: WO2021/005158
PCT Pub. Date: Jan. 14, 2021

(65) Prior Publication Data
US 2022/0313400 A1    Oct. 6, 2022

(30) Foreign Application Priority Data
Jul. 10, 2019 (EP) .................................... 19382587

(51) Int. Cl.
*A61C 8/00*    (2006.01)
(52) U.S. Cl.
CPC .......... *A61C 8/0068* (2013.01); *A61C 8/0089* (2013.01)
(58) Field of Classification Search
CPC ............................ A61C 8/0068; A61C 8/0089
See application file for complete search history.

(56) References Cited

U.S. PATENT DOCUMENTS

| | | | |
|---|---|---|---|
| 9,393,086 B2 * | 7/2016 | Zipprich | A61C 8/0068 |
| 10,470,852 B2 * | 11/2019 | Xam-Mar Mangrane | |
| | | | A61C 8/0089 |
| 11,045,226 B2 * | 6/2021 | Biedermann | A61B 17/7082 |

(Continued)

FOREIGN PATENT DOCUMENTS

| | | |
|---|---|---|
| DE | 201 08 605 U1 | 1/2002 |
| EP | 2 607 722 A1 | 6/2013 |
| ES | 1 154 360 U | 4/2016 |

OTHER PUBLICATIONS

International Search Report for PCT/EP2020/069373 dated Dec. 2, 2020 [PCT/ISA/210].

(Continued)

*Primary Examiner* — Ralph A Lewis
(74) *Attorney, Agent, or Firm* — Sughrue Mion, PLLC

(57) ABSTRACT

Dental prosthetic screw, tightening tool and coupling system firstly refers to a screw for retaining and fixing a dental element in a dental implant, said dental element being able to be any component that preferably aims to support a dental structure or dental prosthesis, preferably machined or laser sintered or laser sintered and re-machined or machined by CAD/CAM, and even the structure itself or dental prosthesis. Therefore, different components are used in the manufacture of prostheses on dental implants in human implantology, requiring said components to be retained and fixed to the dental implant by means of screws on the implant. Moreover, the invention relates to a screwdriver or tightening tool compatible with said dental screw and a tightening or coupling system formed by the two.

11 Claims, 19 Drawing Sheets

(56) References Cited

U.S. PATENT DOCUMENTS

| | | | |
|---|---|---|---|
| 2005/0287497 A1 | 12/2005 | Carter | |
| 2007/0117066 A1* | 5/2007 | Jorneus | A61B 17/8877 |
| | | | 433/173 |
| 2008/0085492 A1* | 4/2008 | Hurson | A61C 8/0074 |
| | | | 433/201.1 |
| 2010/0167240 A1* | 7/2010 | Benzon | A61C 8/0089 |
| | | | 81/436 |
| 2012/0103147 A1* | 5/2012 | Farre Berga | B25B 15/005 |
| | | | 81/460 |
| 2014/0186797 A1* | 7/2014 | Haus | A61C 8/0068 |
| | | | 433/173 |
| 2014/0236247 A1* | 8/2014 | Rezach | A61B 17/8615 |
| | | | 606/104 |
| 2017/0105820 A1 | 4/2017 | Aravena | |
| 2022/0313400 A1* | 10/2022 | Carrero Villarroel | ........... |
| | | | B25B 15/005 |

OTHER PUBLICATIONS

Written Opinion for PCT/EP2020/069373 dated Dec. 2, 2020 [PCT/ISA/237].
Written Opinion of the International Preliminary Examining Authority for PCT/EP2020/069373 dated May 27, 2021 [PCT/IPEA/408].
International Preliminary Report On Patentability for PCT/EP2020/069373 dated Oct. 25, 2021 [PCT/IPEA/409].

* cited by examiner

A-A

B-B

C-C

D-D

E-E

F-F

G-G

H-H

I-I

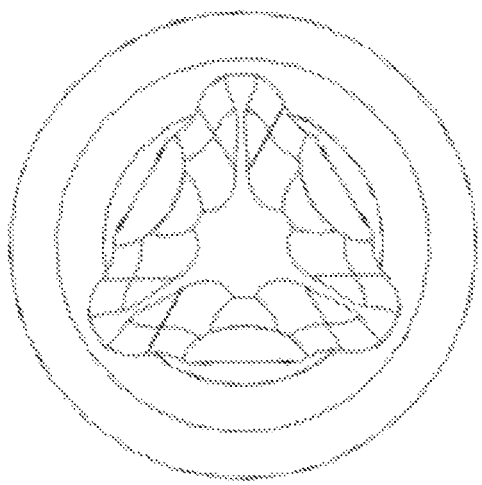
FIG. 23A
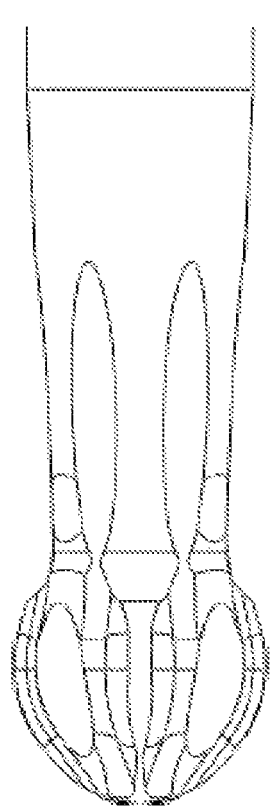 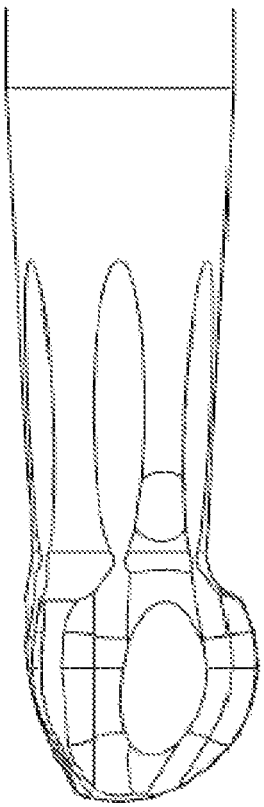
FIG. 23B  FIG. 23C

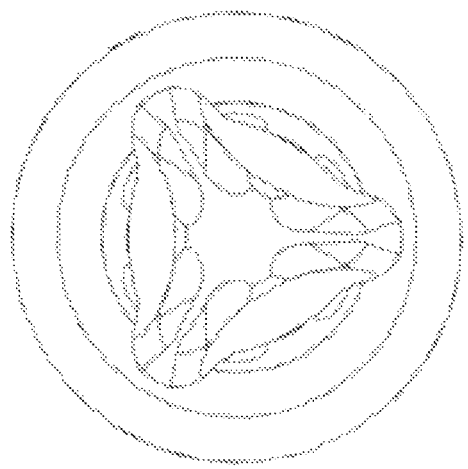
FIG. 24A
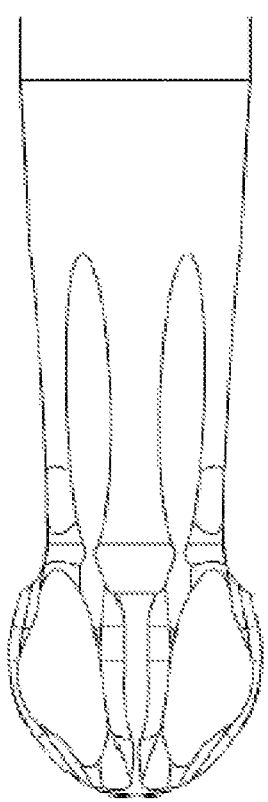 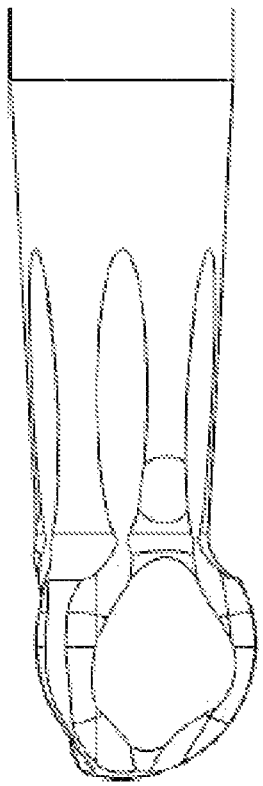
FIG. 24B  FIG. 24C

PROSTHETIC DENTAL SCREW IMPLANT, TIGHTENING TOOL AND COUPLING SYSTEM BETWEEN THE TWO

CROSS REFERENCE TO RELATED APPLICATIONS

This application is a National Stage of International Application No. PCT/EP2020/069373 filed Jul. 9, 2020, claiming priority based on European Patent Application No. 19382587.4 filed Jul. 10, 2019.

OBJECT OF THE INVENTION

The present invention, dental prosthetic screw implant, tightening tool and coupling system, firstly relates to a screw for retaining and fixing a dental element in a dental implant, said dental element being able to be any component that preferably aims to support a dental structure or dental prosthesis, preferably machined or laser sintered or laser sintered and re-machined or machined by CAD/CAM, and even the structure itself or dental prosthesis. Therefore, different components are used in the manufacture of prostheses on dental implants in human implantology, requiring said components to be retained and fixed to the dental implant by means of screws on the implant. Moreover, the invention relates to a screwdriver or tightening tool compatible with said dental screw and a tightening or coupling system formed by the two.

The present invention pertaining to the dental prosthetic sector aims to extend the angle of screwing of a dental component or structure to a dental implant by means of a screw, providing advantages by improving the safety of the screwing system of the CAD/CAM machined or sintered structure, or dynamic pillar, by avoiding a greater number of problems, increasing the durability of the components, increasing the number of solutions to solve aesthetic and functional problems, decreasing the probability of the tool disengaging from the screw head during use, increasing the flexibility of use and maintaining the cost with respect to the screws and screwdrivers used in the state of the art.

BACKGROUND OF THE INVENTION

In the state of the art there are different solutions for applying a tightening torque on a screw in an angled manner, but depending on the different clinical situations, it may sometimes be necessary to increase the angle of screwing, formed by the longitudinal axis of the screw, usually coinciding with the axis of the implant, and the axis of the tool acting on the head of said screw.

Adjusting the angulation enables a tightening torque to be applied which ensures the retention and fixation of the screw and the implant within a specific range of inclination. As mentioned, the screw is used to fix and retain a dental structure or dental prosthesis to the dental implant, either directly or indirectly through intermediate components such as interfaces or attachments. In addition, the screw can be used to retain different components by screwing them into dental models, that is, to screw away from the mouth, for example, during moulding in order to manufacture the prosthesis or for teaching purposes.

There are different fixation devices for joining two dental elements, in particular prosthetic screws for dental implants, which have heads with different geometries that cooperate with complementary screwdriver tips for screwing the screw to another element by means of the screw thread. In the state of the art, no fixing device or screw with a head at one end and a thread at the opposite end that allows its operation by means of a tightening tool or screwdriver is known, such that between the axis of the screwdriver and the axis of the screw, on the head of which the screwdriver tip is inserted, there is an angle greater than 35° and it enables the screw to be retained and fastened with sufficient guarantees.

As mentioned, screw and tool assemblies are known which enable a tightening torque of the tool to be applied to the screw with an inclination of up to 35°. This screw and tool assembly known in the state of the art comprise five or six lobules, in the shape of the hollow of the screw and the shape of the head of the tool, that allow to reach this inclination. Although this angulation makes it possible to overcome many problems faced by dental professionals, there may be situations in which this inclination is not sufficient, and the following disadvantages are present:
  Attention to a limited number of uses, applications and problem solutions,
  Less possibilities of solving aesthetic and functional problems, and
  Less flexibility of use.

Likewise, prosthetic screws for dental implants are subject to tightening torques and loosening torques on several occasions, which combined with the configuration of the screw head can cause the wear thereof with the consequent risk of either preventing the tightening of the screw or, even worse, preventing the loosening thereof when it is screwed to the implant.

Therefore, the screws and screwdrivers of the state of the art, with five or six lobules in its shapes, have, at least, the following drawbacks:
  a) Possibility of angulation, between screw and screwdriver, limited up to a maximum of 35 degrees;
  b) Risk of stripping the screw head (wear of the contact points, or of the shape, on the screw head on which the screwdriver acts) due to the action of the tool or screwdriver on the screw. The risk of stripping the screw head could involve that the screw cannot be removed from the dental implant with the corresponding consequences for the patient;
  c) Risk of the screwdriver disengaging from the screw head when increasing the inclination of the screwdriver with respect to the screw;
  d) Risk that sufficient torque cannot be transmitted due to the inclination, in order to achieve the necessary tightening, or loosening, between screw and screwdriver.

In view of the aforementioned drawbacks, the present invention proposes a dental prosthetic screw which enables said drawbacks to be overcome, and in particular, which enables the tightening, or loosening, torque to be transmitted between a screwdriver and a screw, necessary when there is no inclination between the two or when the inclination is less than or equal to 35°, greater than 35°, up to 45° and preferably at least 50°, and preventing wear of the screw head due to stripping.

As mentioned, the present invention is applicable to metal and non-metal dental structures for dental implants made by the CAD/CAM process as well as for dynamic pillar assemblies. The structures of the prostheses made by means of a casting process require the dynamic pillar as a base piece to model the structure in wax and then perform the casting by fixing the pillar in its correct position. Furthermore, the metal and non-metal structures made by means of a CAD/CAM process do not require the dynamic pillar since the structure is designed by computer and a machine tool mills said structure, using only the screw and screwdriver of the system for the screwing thereof in angulation.

DESCRIPTION OF THE INVENTION

The present invention overcomes the limitations and disadvantages of the screws and screwdrivers or tightening tools of the state of the art by means of constructive modifications that improve the safety of the screwing system of a prosthetic screw for dental implants and a screwdriver complementary to the screw system, enabling screwing at angles even greater than 35 degrees, from 0° to 45°, preferably to at least 50°. Thus, consequently, a greater number of problems with angulation can be corrected in the retention and fastening of elements to the implants: increasing the number of solutions to problems of improper positioning of the implant; increasing the durability and safety of the screw and the screwdriver by having less wear due to a greater contact surface and the better fit and coupling between the two; allowing greater flexibility of the male and female connections, providing a greater number of solutions to solve aesthetic and functional problems; lower probability of the screwdriver or tool losing contact or disengaging from the screw during threading when there is an inclination between the two at the same time that the required tightening, or loosening, torque is transmitted; lower probability of the screw head losing its geometric shape; greater flexibility of use; and same costs in relation to the screws and tool or screwdrivers of the state of the art.

A first object of the present invention is therefore a fastening device, or screw, according to claim 1, with a thread at one end and a head at the opposite end to receive a tightening tool by said head. The dental prosthetic screw for dental implant object of the invention is intended to be screwed into a threaded housing of a dental implant or equivalent element fixed inside a body, usually the jaw of a patient, such that after inserting the threaded end of the screw in the threaded housing of the implant the same is screwed, or unscrewed, with the help of a tool or screwdriver. The screw goes through a channel, straight or with a change of inclination, of a dental structure or dental prosthesis to retain and fix it to the implant, such that the screw head located at the end opposite that of the thread and with a diameter larger than said thread enables said dental structure or prosthesis to be fixed to the implant. The dental structure has a channel that passes there through with a diameter approximately equal to the diameter of the screw head and at the lower end of the structure it comprises a seating for said screw head, such that it allows the passage of the threaded end but not the head that abuts against the seating in the dental structure, thus enabling said structure to be retained and fixed to the implant after the corresponding tightening of the screw. Depending on the location of the channel in the structure, it will be necessary to apply the tightening, or loosening, torque to the screw with a more or less inclined tool, said inclination could be up to 45°, or preferably it could even be up to 50°, between the axis of the screw and the axis of the screwdriver. The longitudinal axis of the screw preferably coincides with the longitudinal axis of the implant once the screw is screwed into the implant.

As will be explained below, the screw and complementary tightening tool, object of this invention, have a shape for the hollow of the screw and the head of the tool, with exclusively three equidistant lobules in order to overcome the drawbacks of screws and tools in the prior art with five or six lobules. According to the previously mentioned drawbacks:

a) The possibility of angulation, is larger than that in the prior art solutions, reaching up to 45°, preferably 50°, of inclination between the tool and the screw, because of the specific geometrical shape of the hollow of the screw and of the head of the tool, mainly because of the length of the arcs that constitute the lobules;

b) The risk of stripping the screw head (wear of the contact points, or of the shape, on the screw head on which the screwdriver acts) is reduced compared with the prior art solutions because the amount of material (in which the screw is manufactured) is larger between contact points or lobules (greater separation between lobules than in prior art) and therefore the head of the screw is more resistant than that of the prior art solutions (when screws and screwdrivers of the same materials are compared), c) The risk of the screwdriver disengaging from the screw head when increasing the inclination of the screwdriver with respect to the screw is also reduced when compared with the prior art solutions, and d) The risk that sufficient torque cannot be transmitted due to the inclination, in order to achieve the necessary tightening, or loosening, between screw and screwdriver is also reduced when compared with the prior art solutions.

The screw head, with a diameter larger than the threaded end of the screw, is provided with a longitudinal hollow or housing with inner walls extending a certain distance along the longitudinal axis of the screw. In particular, the walls of the hollow are preferably parallel to the longitudinal axis of the screw, although they could be slightly inclined with respect thereto, defining a frustoconical hollow or housing, and they extend a certain length inside the head. The bottom of the hollow, after the wall thereof, has a preferably frustoconical section but it could also be semi-circular or flat. Said hollow comprises in a cross section perpendicular to the longitudinal axis:

an opening of the hollow, with a shape consisting of a first circumference with a first diameter and exclusively only three first arcs exterior to said first diameter, or lobes or projections, which determine a hollow with a larger area than the hollow determined by the first circumference, the length of said three first arcs being shorter than the length of a semi-circumference, or half of a circumference, with the same radius as that of said three first arcs, and the three centres of each first arc, equidistant from each other, are located on the same third circumference with a diameter concentric to the diameter of the first circumference. The diameter of said third circumference is smaller than the diameter of the first circumference. The arcs have a centre that corresponds to the centre of a circumference or circle with the same radius as the arcs. For drawing said arcs the centre of each of them is placed, or located, on the same circumference. Said three centres are equidistant to each other and by joining the same describe an equilateral triangle.

Further, the three first arcs are inscribed in, and tangent to, a second circumference with a diameter larger than the first circumference, both circumferences being concentric.

Preferably, each first arc is joined to the first circumference by means of two second arcs, the centres of said second arcs being located on a fourth circumference having a diameter larger than the diameter of the second circumference, such that the transverse cross section of the hollow is mainly circular with three lobes with their equidistant centres. Anyway, the first arcs could be joined to the first circumference by second arcs with a smaller diameter, that is to say, with its centres located on a fourth circumference with a diameter larger than the one of the first diameter but smaller than the second diameter. Said second arcs could even disappear, so that the first arcs join the first circumference directly, that is to say, through a sharp edge.

The centre of each first as already mentioned, on the third circumference. The arc is a segment of a circle or circumference with the same radius as the centre of said circle or circumference, therefore, the centre of the arc is the centre of said circle or circumference. This applies too to the embodiments where the second arcs exist, being the centres of said second arcs placed on a fourth circumference.

Preferably, in the above transverse cross section, each of the second arcs are tangent to said first circumference at one end and tangent to one of the three first arcs at the other end, such that the transition between the central circular opening of the hollow and the lobes is continuous. To improve said continuity between the first and second arcs, both arcs preferably have a radius with the same dimension, and preferably the same length, although said radius could be smaller than that of said first arcs. In some embodiments these second arcs could even disappear.

With this configuration a screwdriver with a head having a transverse cross section with only three projections, preferably complementary to the projections of the hollow of the screw head, with dimensions slightly smaller than those of said hollow in order to be able to be inserted therein, can preferably be inclined at least up to 45°, preferably 50°, with respect to the longitudinal axis of the screw. To achieve this inclination, each of the projections of the screwdriver head has a curved profile in its longitudinal cross section which enables the screwdriver head to pivot, and thus incline, with respect to the hollow or housing of the screw. The inclination is measured between the longitudinal axis of the screw and the longitudinal axis of the screwdriver. A second object of the invention is, therefore, a screwdriver or tightening tool according to claim 8. Specifically, a screwdriver, to act in the hollow of a dental prosthetic screw, which has an action tip at one end, intended to be inserted in the prosthetic screw housing and a handle, support or fastening area at the end opposite that of the tip, said tip having only three projections that determine three lobes, the transverse cross section of which determines at least one outer arc in each lobe and an equilateral triangle determining the joining of the centres of said radii, and the longitudinal cross section of said projection or lobe of the screwdriver tip also determines an outer arc or spherical spindle.

Likewise, the screwdriver head can alternatively have a transverse cross section that, in addition to the three projections complementary to those of the hollow of the screw head, have other configurations between said projections, for example, more or less pronounced inlets between said projections of the screwdriver, so as to allow cooperation between the screwdriver and the screw, or a shape completely complementary to that of the screw housing.

To achieve said inclination between the tool or screwdriver and the screw, the screw head, specifically the hollow or housing in the screw head, and the screwdriver tip must preferably have a specific ratio between the dimensions of the parts that make up said head and said tip. Likewise, it must be considered that, due to the small dimensions of the screw and of the screwdriver head, and the manufacturing process thereof, preferably by machining, said dimensions may vary slightly due precisely to manufacturing tolerances, such that, although certain dimensions should ideally be the same, in practice they are not due to said manufacturing tolerances and even errors therein. Therefore, in the present description, when mentioning that two dimensions are equal, it must be understood that it refers to ideal conditions that in practice are truly difficult to achieve.

According to the above, the ratios between the different parts of the screw that determine the shape of the hollow or housing of the head are preferably:
the diameter of the third circumference B is ideally 0.87 times the diameter of the first circumference A.
the radius of the first arcs Re is ideally 0.19 times the diameter of the first circumference A.

Further, the outer diameter D of the screw head is ideally 1.56 times the diameter of the first circumference A.

The first circumference A has a diameter between 0.8 mm and 3 mm.

As mentioned above, said ideal conditions are difficult to achieve mainly due to the manufacturing process, such that dimensions that approach the above ratios, and are within manufacturing tolerances, are also considered object of the present invention, since these approximations will be given to absorb the differences in machining.

Likewise, the longitudinal hollow in the screw head is determined by the length of the inner wall or walls, its beginning at the inlet of the hollow being depressed, or displaced, with respect to the outer surface of the screw head. Thus, the total depth of the hollow is determined by the length of the wall between the bottom of the longitudinal hollow and the beginning thereof at the inlet of the hollow, and the distance between the beginning of the wall and the outer surface of the screw head. The surface between the beginning of the wall and said outer surface is preferably inclined/chamfered. Likewise, after the bottom of the longitudinal hollow determined by the end of the wall or walls, a termination is preferably provided, with a preferably frustoconical or semi-circular cross section so that the end of the screwdriver tip is inserted therein, if necessary.

The dimensions of the different parts of the longitudinal hollow in its longitudinal cross section should also preferably maintain a ratio there between:
the length T between the end of the wall at the bottom of the longitudinal hollow and the outer surface of the screw head is ideally 0.68 times the diameter of the first circumference A.
the distance C between the beginning of the wall and the outer surface of the screw head is ideally 0.20 times the diameter of the first circumference A.

As in the case of the screw head, the ideal conditions are difficult to achieve due to the manufacturing processes, such that approximate dimensions of the aforementioned ratios, within manufacturing tolerances, of approximately +/−20% are also object of the present invention if they enable the objectives of the same to be achieved.

In accordance with the aforementioned ratios:

$$A = \frac{B}{0.87} = \frac{Re}{0.19} = \frac{C}{0.20} = \frac{T}{0.68} = \frac{D}{1.56}$$

By means of the above, ideal and approximate ratios, the objectives of the present invention and, in particular, a robust and reliable design of the hollow of a dental screw are achieved to avoid the wear of the geometry thereof due to the distance between the projecting lobes thereof and the lack of inlet lobes that are susceptible to greater wear. Also, due to the particular geometry thereof combined with the tip of a screwdriver or tightening tool, it is possible to incline the screwdriver from 0° until the axis thereof forms at least 45 degrees, and preferably even up to 50°, with the longitudinal axis of the screw.

A second object of the invention is, as mentioned above, a screwdriver or tightening tool that along a longitudinal axis "t" has at one lower end an action tip which is inserted in the hollow of the screw head and at the opposite upper end has a fastening area. Both ends are joined by the body of the screwdriver or handle followed by a rod that joins said body to the action tip. In any case, for the purposes of the present invention, the essential part of the screwdriver is the configuration of the tip, so that in order for the screwdriver to act on the screw, the tip must be able to be coupled and act together with the geometry of the housing or hollow of the screw. Thus, the tip of the screwdriver must have only three projections that are complementary in the transverse cross section thereof with the projections of the hollow of the screw head described above and in the longitudinal cross section thereof each projection has a curved profile, with a specific radius, that enables the screwdriver head to pivot, and thus incline with respect to the hollow or housing of the screw. The longitudinal cross sections of the screwdriver head on one of the projections have on one side the curvature of the radius of the projection and on the opposite side the shape of the cross section that is arranged between the projections of the tip.

Therefore, a screwdriver, to act in the hollow of a dental prosthetic screw, having an action tip, intended to be inserted in the prosthetic screw housing, at one end and a handle or support at the end opposite to that of the tip, wherein the tip comprises only three projections that determine three lobes, preferably inscribed in a second circumference, the transverse cross section of which determines at least one outer arc in each lobe with a radii, the joining of the centres of said radii determining an equilateral triangle, and the longitudinal section of said projection or lobe of the screwdriver tip also determines an outer arc. The ratios between the different parts of the screwdriver tip and the parts of the previously described screw are:

the diameter of the first circumference A of the screw is ideally 1.14 times the diameter of the first circumference F of the tip of the screwdriver, the diameter of the first circumference A of the screw is ideally 1.17 times the diameter of the third circumference E of the tip of the screwdriver, the diameter of the first circumference A of the screw is ideally 6.4 times the radius of each lobe Red of the screwdriver, and the diameter of the first circumference A of the screw is ideally 0.87 times the outer radius H of the screwdriver tip, in the longitudinal cross section of each lobe.

The first circumference F has a diameter between 0.8 mm and 3 mm.

Thus, preferably, the transverse cross section of the screwdriver tip is determined by a first circumference with a first diameter and by the three first arcs exterior to said first diameter, or lobes or projections, which determine a surface with an area larger than that of the first circumference, the length of said first arcs being shorter than the length of a semi-circumference, or half of a circumference, with the same radius as that of said first arcs, said three first arcs inscribed in, and tangent to, a second virtual circumference with a diameter larger than the first circumference, both circumferences being concentric, and the centres of each first arc, equidistant from each other, are located on a third circumference with a diameter concentric to the diameter of the first and second circumferences. Further, preferably each first arc is joined to the first circumference by means of two seconds arcs, the centres of said second arcs being located on a fourth virtual circumference having a diameter larger than the diameter of the second circumference, such that the transverse cross section of the approximately spherical tip is mainly circular with the three lobes with their equidistant centres. Anyway, the first arcs could be joined to the first circumference through second arcs with their centres in a fourth circumference with a diameter smaller than the second circumference or even these second arcs could not exist, so that the first arcs would join to the first circumference through a sharp edge. The first circumference could even not exist between the first arcs if the same are joined between them through other curved or straight lines.

In a preferred construction, the screwdriver tip has an apparently spherical shape, i.e. with a spherical appearance, with its transverse cross section, perpendicular to the longitudinal axis of the screwdriver, complementary to the transverse cross section, perpendicular to the longitudinal axis of the screw, of the hollow of the screw head or with the mouth or inlet of the hollow of the screw. If in the transverse cross section the area between the projections of the screwdriver is complementary to the existing shape between the projections of the hollow of the screw, said area will have a spherical appearance, in fact, it will be a spherical wedge. Alternatively, other constructions may be arranged between the projections.

Therefore, in this way, a transverse cross section in the middle of the screwdriver tip along the longitudinal axis, coinciding with approximately the half of one of the projections, preferably has a cross section complementary to that of the hollow of the screw, increasing the area of said cross section from the lower pole until reaching the diameter of the spherical tip of the screwdriver, from which the area of the cross section begins to decrease until reaching the base of the rod, thus having the approximately spherical shape. The complementary part of the screwdriver tip with the hollow or housing of the screw head must always be the part with the three projections or lobes of the screwdriver tip, complementary to the three projections of the hollow of the head of the tooth.

The lower end of the screwdriver tip may have a protrusion on its lower pole, on the side opposite that of the joining of the tip with the rod. Said protrusion can have different shapes or even not exist and even the lower end of the screwdriver tip can be flat.

Said apparently spherical shape, i.e. with a spherical appearance, of the screwdriver tip is defined by curved walls, by way of first spherical spindles, separated from each other by depressions which are also spherical and by way of second spindles and by way of projections, like third spherical spindles. The spherical third spindles have a thickness smaller than the first spherical spindles, while the spherical depressions have a thickness less than that of the third spherical spindles. The depressions are a continuation of recesses made in the lower end of the screwdriver rod to weaken the same and enable the screwdriver to be separated into two parts in the event that a certain torque is exceeded and the screw on which said torque is applied does not rotate. This prevents damage to the screw. As mentioned, the screwdriver tip is stripped at the lower part with a protrusion or projection that can have a conical, spherical or flat shape, although it is not essential for the development of the screwdriver.

Therefore, and taking into account the previous description of the cross section of the hollow of the screw, the screwdriver has, in a preferable construction that is complementary to the cross section of the hollow of the screw:

- a transverse cross section of its tip, determined by a first circumference F with a first diameter and by three first arcs exterior to said first diameter, or lobes or projections, which determine a surface with an area greater than that of the first circumference, the length of said first arcs being shorter than the length of a semi-circumference with the same radius Red as that of said first arcs,
- said three first arcs inscribed in, and tangent to, a second virtual circumference with a diameter larger than the first circumference F, both circumferences being concentric, and
- the centres of each first arc, equidistant from each other, are located on a third circumference E with a diameter concentric to the diameter of the first F and second circumferences.

Preferably, as mentioned, each first arc is joined to the first circumference by means of two second arcs, the centres of said second arcs being located on a fourth virtual circumference having a diameter larger than the diameter of the first circumference and smaller than the diameter of the second circumference, such that the transverse cross section of the approximately spherical tip is mainly circular with three lobes with their equidistant centres.

For the screwdriver tip to couple to the hollow of a screw head, the first diameter of the screwdriver tip F must be slightly smaller than the first diameter A of the hollow of the screw head, thus allowing the screwdriver tip to be inserted for its coupling in said hollow. In general, the dimensions of the screwdriver parts, complementary to those of the hollow of the screw, should be slightly smaller than those of said screw.

According to the preceding preferred construction, the ratios between the different parts of the screwdriver are, preferably:

- the diameter of the third circumference E is ideally 1/1.17 times the diameter of the first circumference A of the screw.
- the diameter of the first circumference F is ideally 1/1.14 times the diameter of the first circumference A of the screw.
- the radius of the first arcs Red is ideally 1/6.4 times the diameter of the first circumference A of the screw.
- the outer radius of the screwdriver tip H, in its largest transverse cross section, is ideally 1/0.87 times the diameter of the first circumference A of the screw, As already mentioned, these are ideal ratios that, due to the manufacturing process by machining, can be difficult to achieve, for which reason the approximate ratios, within tolerances due to the manufacturing process, will also be object of the present invention.

Likewise, it is possible to arrange a screwdriver tip that is not complementary in its transverse cross section to the transverse cross section of the hollow of the screw, although it will be necessary for the radii of the projections to have a certain ratio with the diameter of the circumference in which said three projections and the radius of the arc in the longitudinal section of the projection are inscribed. In this case where the screwdriver tip is not complementary to the housing of the screw, it is necessary for the above ratios to exist.

All these ratios are ideal, but they are likely to be affected during the machining of the components, the machining tolerance being in the values of approximately +/−20%.

In accordance with the aforementioned ratios:

A=1.14 F=1.17 E=6.4 Red=0.87 H

It should be noted that the other dimensions of the screwdriver, in the event that the shape thereof in its larger transverse cross section is not complementary to that of the hollow of the screw, may vary. For example, the inner radius Rid joining the outer radius Red of the projection of the screwdriver to the first diameter F of said screwdriver can be different depending on the shape that is desired for the screwdriver. Also, the distance between the larger transverse cross section of the screwdriver and the lower pole may vary depending on the end of said pole, which may be apparently spherical, or ending in a cone, or ending in a plane resulting from having truncated the cone or the sphere, or another alternative construction.

With regards to the previous ratios, both of the screwdriver and of the screw, it must be taken into account that the measurements of said dimensions are made:

- In the case of the screwdriver, wherein the transverse cross-sectional area of the head of the same is larger,
- In the case of the screw, with a housing with walls parallel to the longitudinal axis of the screw, at any point of the housing, since it should be equal along the length thereof, and preferably in the middle of said housing, and
- In the case of the screw, with a housing with walls inclined with respect to the longitudinal axis of the screw, in the area where the larger transverse cross section of the screwdriver comes in contact with the walls of the housing.

A third object of the invention, according to claim 11, is a coupling system formed by a screw and a screwdriver such as those described above.

Therefore, and in line with what has already been mentioned, the present invention enables:

- Improving the safety of the screwing system formed by a dental prosthetic screw and a screwdriver since the resistance to stripping is increased by increasing the resistant cross section between lobes in front of the hollows of the screws of the state of the art. Specifically, in front of a screw and screwdriver with five or six lobes, the resistance to the stripping of the object of the present invention is double, compared to one of six lobes, when having three lobes or projections. All this while maintaining the capacity of angulation and torque transmission.
- Achieving screwing at angles greater than 35 degrees, including screwing the screw with the screwdriver from 0° to at least 45°, and preferably at least 50°, between the longitudinal axis of the screw and the longitudinal axis of the screwdriver, preventing the screwdriver or tool from losing contact or disengaging from the screw during threading or screwing when there is an inclination between the two at the same time that the required tightening, or loosening, torque is transmitted, preferably between 5 and 55 N·cm, although the same will depend on the metric of the screw since it will depend on different resistant sections, for example: for M1.2 approximately 15 N·cm; for M1.4 mm approximately 15 N·cm; for M1.6 mm approximately 20 N·cm; for M1.8 approximately 25 N·cm; for M2 approximately 30 N·cm; for M2.5 mm approximately 30 N·cm, etc.
- Correcting a greater number of problems with angulation of the implants than in the state of the art, increasing the number of solutions to problems of improper positioning of implants to solve aesthetic and functional problems.

Increasing the durability of the screw by having less wear due to a greater contact surface and the better fit and coupling between screw and screwdriver, thus reducing the possibility of the screw head losing its geometric shape.

Maintaining the same costs in relation to the screws and tools or screwdrivers of the state of the art.

Additionally, it is necessary to emphasize that since the manufacture of the different parts of the invention can be affected by the tools used, as well as the wear thereof during manufacturing, it is necessary to provide each measurement with a manufacturing tolerance, which are:

DESCRIPTION OF THE FIGURES

To complement the description made herein and for the purpose of helping to make the features of the invention more readily understandable, a set of figures is included, which by way of illustration and not limitation represents the following:

FIGS. 23A-23C show an alternative of a screwdriver tip, with a bottom view (23A) of the tip and two side views (23B, 23C).

FIGS. 24A-24C show another alternative screwdriver tip, with a bottom view (24A) of the tip and two side views (24B, 24C).

PREFERRED EMBODIMENT OF THE INVENTION

Next, and referring to the previous figures, different embodiments of the objects of the present invention will be described.

Figure 1:
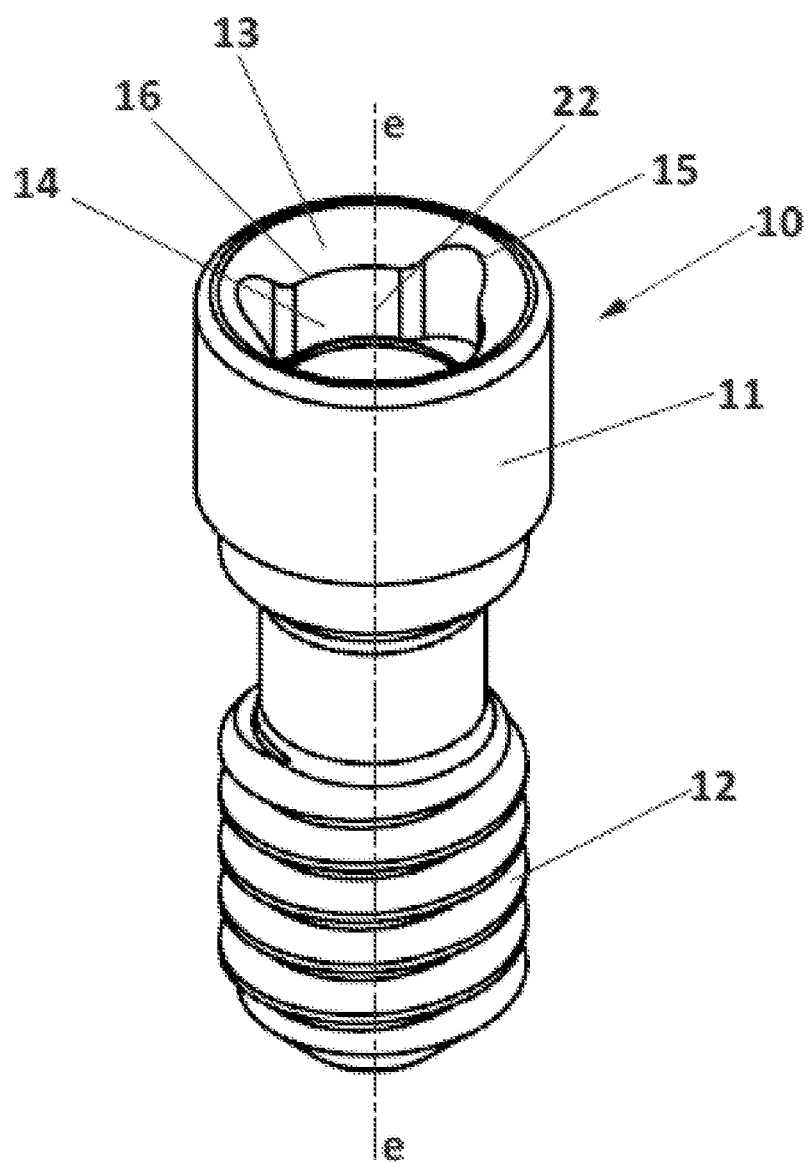
FIG. 1 shows a perspective view of a screw according to the present invention.

FIG. 1 shows a screw 10 object of the present invention, with a longitudinal axis "e", and comprising a thread 12 at one end and the head 11 of the screw 10 at the end opposite that of the thread. Said head 11 has a longitudinal hollow or housing 14 for receiving the tip 150 of a screwdriver 100 or tightening/loosening tool. Said housing or hollow 14 comprises an opening determined by a first circumference 16 with a first diameter and with three first outer arcs 15 or lobes that increase the transverse surface of the opening with respect to the surface of an opening of a first circumference 16 with said first diameter. Likewise, the length of the perimeter of said opening of the housing 14 is longer than the length of the perimeter of the first circumference 16. The length of said first arcs 15 is shorter than the length of a semi-circumference, or half a circumference or circle, with the same radius as that of said first arcs 15. In turn, said three first arcs 15 are inscribed and tangent to a second circumference 17 having a diameter larger than the first circumference, said first circumference 16 and second circumference 17 being concentric with their centre on the "e" axis. Also the equidistant centres of the three first arcs 15 are located on a third circumference 18 also concentric with the first circumference 16 and second circumference 17. The joining of the first arcs 15 and the first circumference 16 is preferably carried out by means of second arcs 19, the centres of which are located on a fourth circumference 21 with a diameter that is preferably larger than the diameter of the second circumference 17. Said housing 14 is inscribed in the head 11 of the screw 10, which preferably has a circular shape with a diameter larger than the diameter of the second circumference 17. The second arcs 19 are preferably tangent to the first circumference 19 at one of the two ends thereof and tangent to a first arc 15 at the opposite end, thus determining an opening with three equidistant lobes or arcs with the same radius.

The diameter of said second arcs could vary and therefore the centre of the same could even be located on a fourth circumference with a diameter smaller than the diameter of the second circumference, but larger than the diameter of the first circumference. Said second arcs could even disappear so that the first arcs could be joined to the first circumference through sharp edges.

Figure 7A:
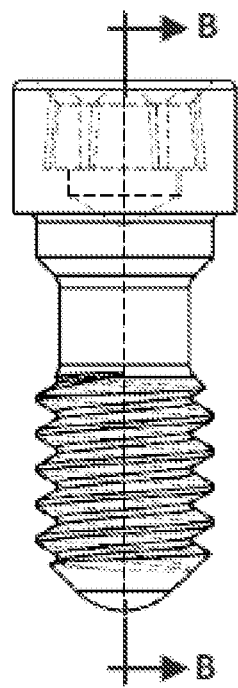
FIGS. 7A-7B show a longitudinal cross section (7B) and a side view (7A) of a screw with the inclined walls of the hollow.
Figure 7B:
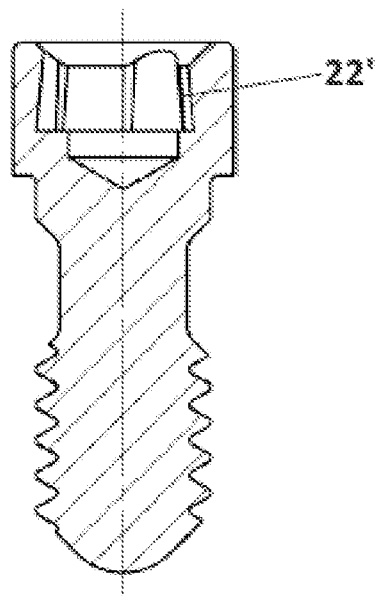
Figure 8A:
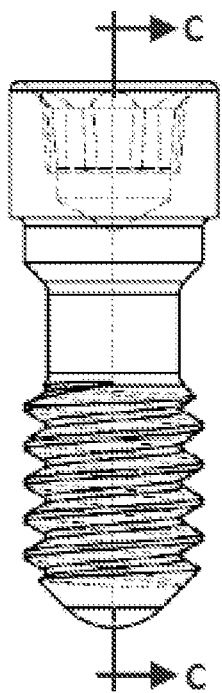
FIGS. 8A-8B show a longitudinal cross section (8B) and a side view (8A) of a screw with the inclined walls of the hollow, with an inclination different to that of FIGS. 7.
Figure 8B:
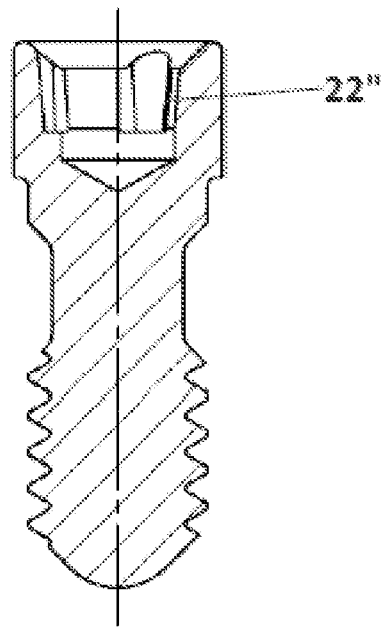

In said FIG. 1 it is shown how the housing 14 is determined, in addition to the form of opening thereof, by the depth of said housing, comprising walls 22 preferably parallel to the longitudinal axis "e" of the screw and following the shape of the cross section of the opening of the housing, i.e. a circumference with three projecting lobes. The shape of the walls 22 is preferably the shape of the transverse cross section of the opening of the head of the tooth described above. Alternatively, as shown in FIGS. 7A-7B and 8, the walls may include some inclination, such that they are not parallel to the axis of the screw. FIGS. 7A-7B shows a hollow or housing with inclined walls (22') such that the hollow is increased as it deepens therein, while FIG. 8A-8B shows inclined walls (22") such that the hollow is reduced as it deepens therein.

Figure 2A:
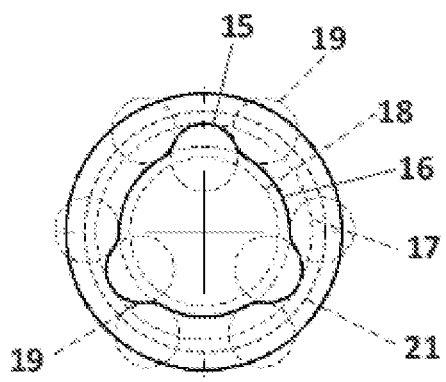
FIGS. 2A-2C show a side view of the screw (2B), a side view showing the hollow in the screw head (2C) and a plan view of the screw head (2A).
Figure 2B:
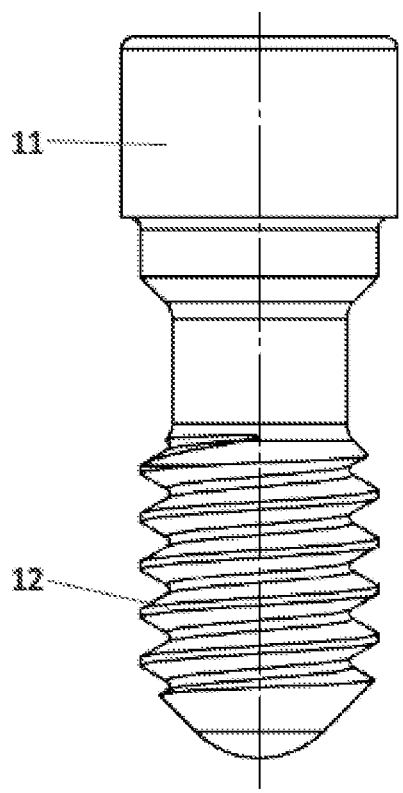
Figure 2C:
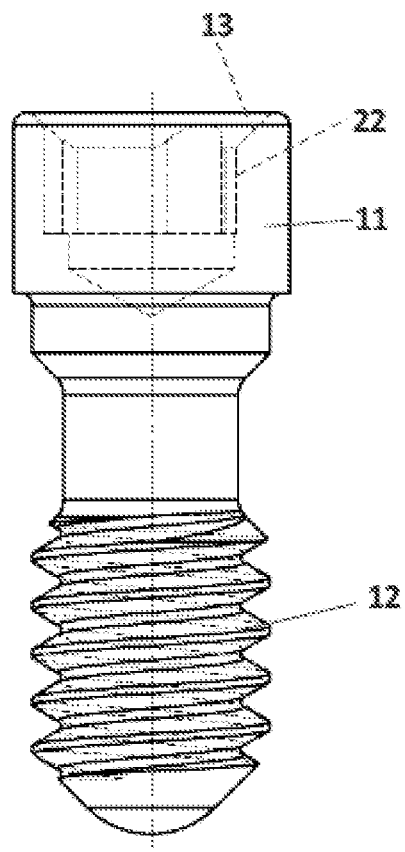

FIGS. 2A-2C shows three views of the screw of FIG. 1, wherein the different diameters discussed above and defining the shape of the opening of the housing 14 can be observed in the plan view. The shape of the inner housing or hollow can also be seen as a dotted line in one of the elevation views, with the lower end thereof or bottom having a conical longitudinal cross section. Alternatively, said lower end or bottom could be semi-circular or frustoconical. It can also be seen how the walls 22 of the housing 14 are parallel to the longitudinal axis "e" of the screw 10. However, said walls could also be slightly inclined, determining an opening with a transverse cross section larger than the cross section of the bottom of the hollow where the wall 22 ends (FIGS. 8A-8B) or vice versa (FIGS. 7A-7B).

Figure 3A:
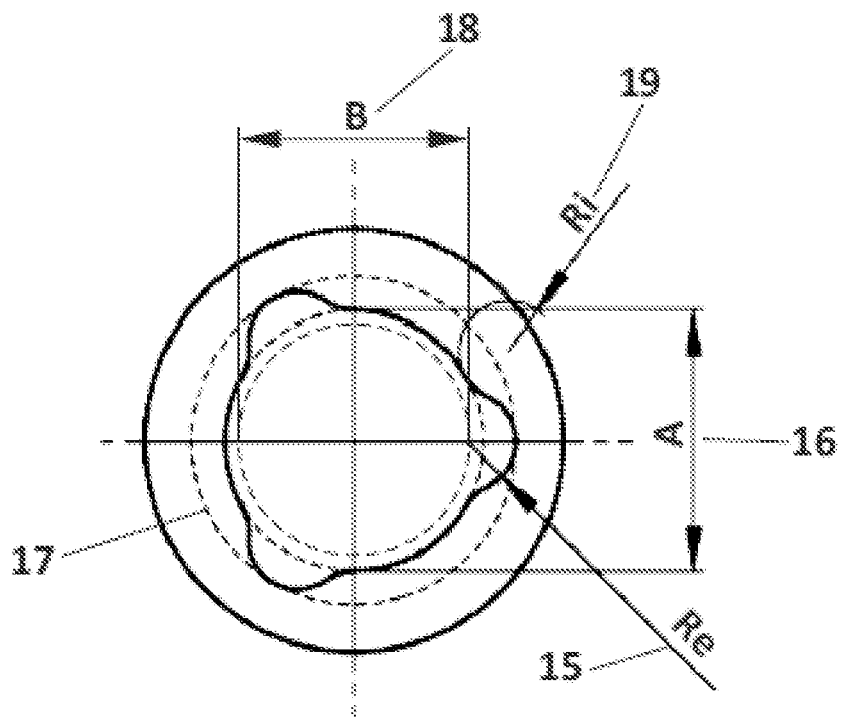
FIGS. 3A-3B show a plan view (3A) and a cross section (3B) of the screw head in which the different parts of the screw head are shown.
Figure 3B:
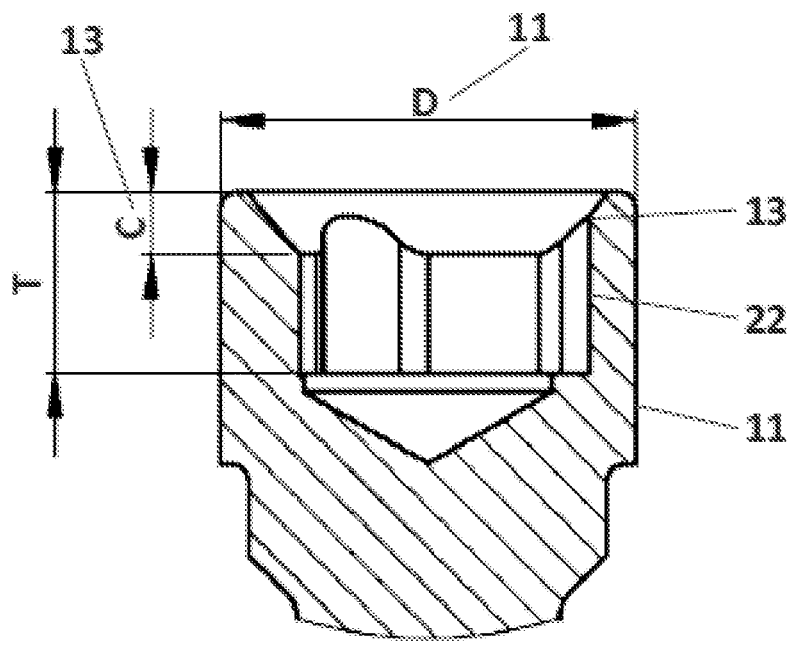
Figure 4A:
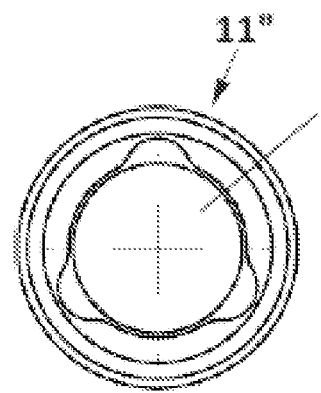
FIGS. 4A-4F show different plan views (4A, 4C, 4E) and the corresponding elevation views (4B, 4D, 4F) thereof of three exemplary screws (10, 10', 10").
Figure 4C:
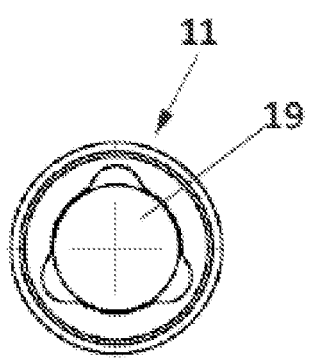
Figure 4E:
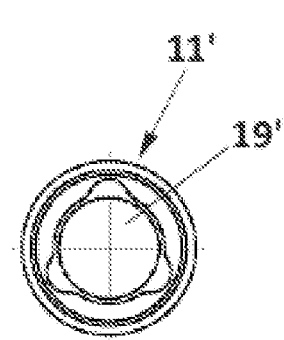
Figure 4B:
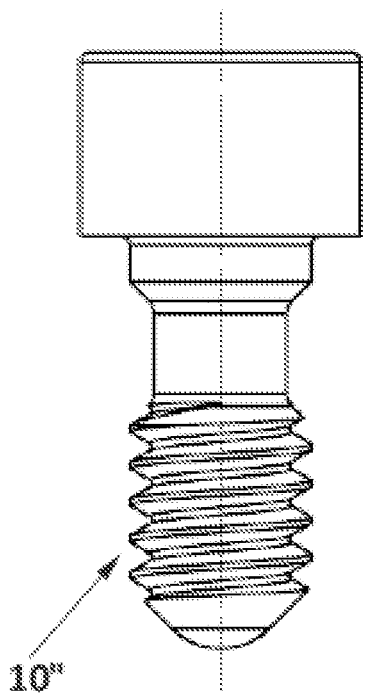
Figure 4D:
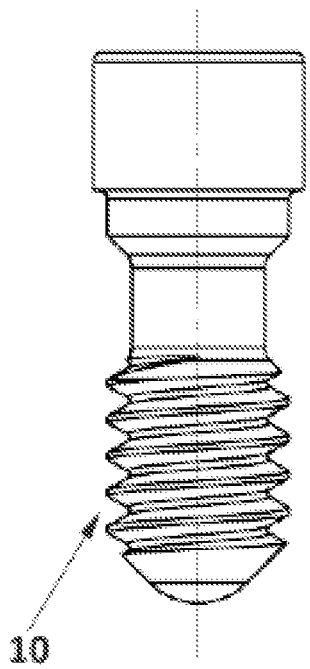
Figure 4F:
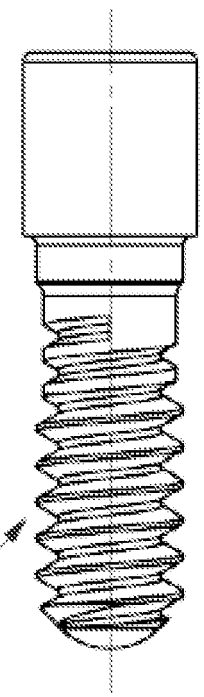
Figure 5A:
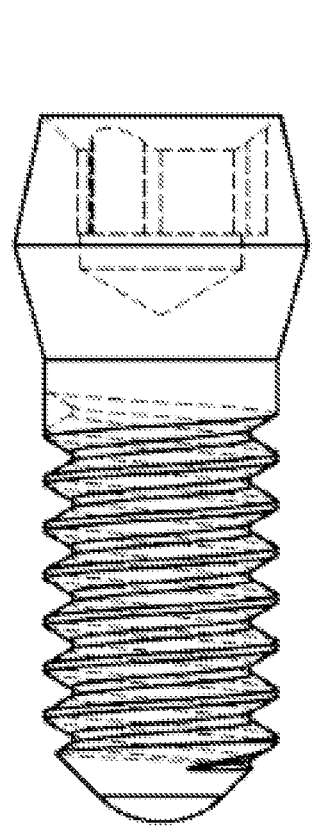
FIGS. 5A-5D show the plan view (5B, 5D) and an elevation view (5A, 5C) of two additional exemplary screws (10", 10''').
Figure 5C:
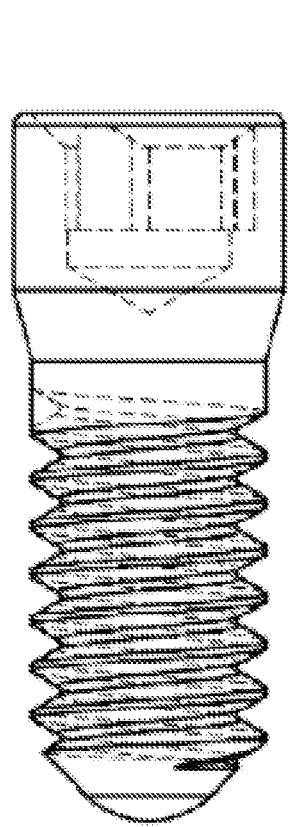
Figure 5B:
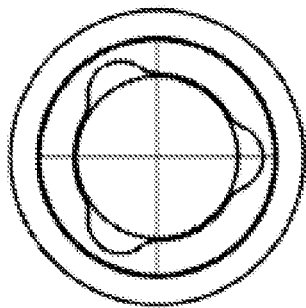
Figure 5D:
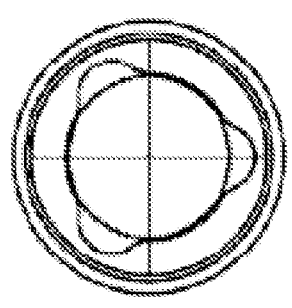

FIGS. 3A-3B shows the different parts and parameters that determine the geometry and shape of the screw head, namely:

Re, which represents the radius of the three first outer arcs 15,
Ri, which represents the radius of the second arcs 19,
A, which represents the diameter of the first circumference 16,
B, which represents the diameter of the third circumference 18,
D, which represents the outer diameter of the screw head 11,
T, which represents the length between the end of the wall 22 at the bottom of the housing 14 and the outer surface of the screw head 11, and
C, which represents the distance between the beginning of the wall 22 at the opening, side opposite the bottom of the housing 14, and the upper surface of the screw head 11 furthest from the end with the thread 12.

The ratio between these parameters is, as mentioned:

$$A = \frac{B}{0.87} = \frac{Re}{0.19} = \frac{C}{0.20} = \frac{T}{0.68} = \frac{D}{1.56}$$

Thus, by determining the diameter of the first circumference 16 (A) of the screw, in which the projections of the hollow of the screw are inscribed, all the dimensions of the hollow of the screw can be obtained, the diameter of said first circumference 16 (A) being between 1 mm and 3 mm in the dental sector. The screwdriver values are also obtained from these values.

FIGS. 4A-4F shows three screw alternatives, A (10"), B (10) and C (10'), according to the present invention, wherein the dimensions of the different parts of the screw vary and the variation of dimensions of the heads (11", 11, 11') of the screw is mainly shown, where the screw A (10") has the head (11") with the larger outer diameter, of approximately (X); the screw B (10) has the head (11) with the intermediate outer diameter; and the screw C (10') has the head (11') with the smaller outer diameter. The dimensions of the transverse cross section of the opening are also different and are determined by the diameter of the second circumference (17). FIG. 5A-5D shows two views of two other examples of screws (10''', 10$^{iv}$), respectively.

The screws of the previous figures have the same configuration (19, 19', 19") with respect to the hollow or housing of the head of the screws although with different dimensions, and they also have different shapes and lengths with respect to other parts of the screw which are not object of the present invention, such as the length of the threaded end or the external shape of the screw to adapt to different housings.

Figure 6A:
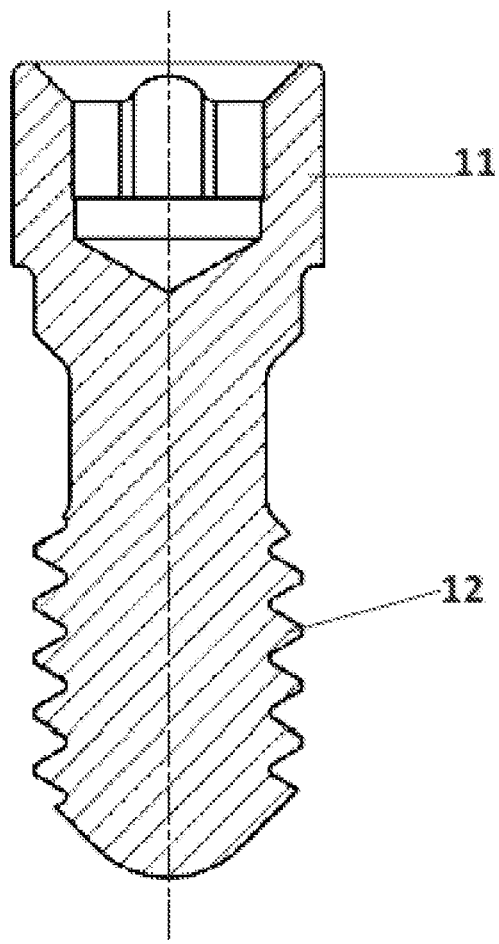
FIGS. 6A-6B show a longitudinal cross section (6A) and a plan view (6B) of the screw of FIG. 1.
Figure 6B:
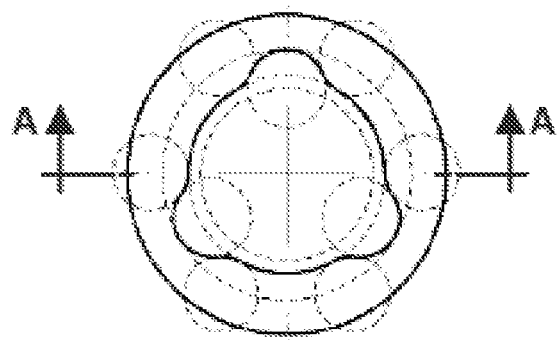

FIGS. 6A-6B shows a longitudinal cross section of the screw 10 of FIG. 1 and a plan view of the head 11 thereof wherein the different diameters and dimensions making up the shape of the housing 14 can be observed.

In particular, and as has been anticipated, the dimensions of the head 11 of the screw 10 and the housing 14 thereof are determined according to the following ratios between the different parts of the screw 10:

the diameter of the third circumference 18 is equal to 0.87 times the diameter of the first circumference 16.
the radius of the first arcs 15 is equal to 0.19 times the diameter of the first circumference 16.

Further, the outer diameter of the head 11 of the screw 10 is approximately 1.56 times the diameter of the first circumference 16.

Likewise, with regards to the housing or hollow 14 of the head 11 of the screw 10, the same determined by the beginning of the wall 22 and the end thereof at the bottom of the hollow 14 is depressed with respect to the outer surface of the head 11 of the screw 10. The length between the end of the wall 22 at the bottom of the housing 14 and the upper surface of the screw head 11 is equal to 0.68 times the diameter of the first circumference 16. Likewise, the distance between the beginning of the wall 22 on the side opposite that of the bottom of the housing 14 and the upper surface of the screw head 11 furthest from the end with the thread 12 is 0.20 times the diameter of the first circumference 16. Thus, preferably the surface between the beginning of the wall 22 and the upper surface of the screw head 11 is inclined or chamfered, between 30° and 60°.

In FIGS. 9 to 14A-14E a first preferred embodiment of a screwdriver 100 according to the present invention is shown. Said screwdriver 100, with a longitudinal axis "t", preferably has a lower end with an action tip 150, which is introduced in the housing 14 arranged in the head 11 of the screw 10 to cause the rotation thereof, and an upper end preferably having a fastening area 110. Arranged between both ends is the body of the screwdriver 100, which can have a handle or body 120 after the upper grip end 110 and followed, immediately before the tip 150, by a rod 130. In any case, for the purposes of the present invention, the essential part of the screwdriver 100 is the configuration of the tip 150. In order for the screwdriver 100 to act on the screw 10, the tip 150 must be able to be coupled and act on the geometry and construction of the housing 14 of the screw 10.

Figures 9, 10A, 10B:
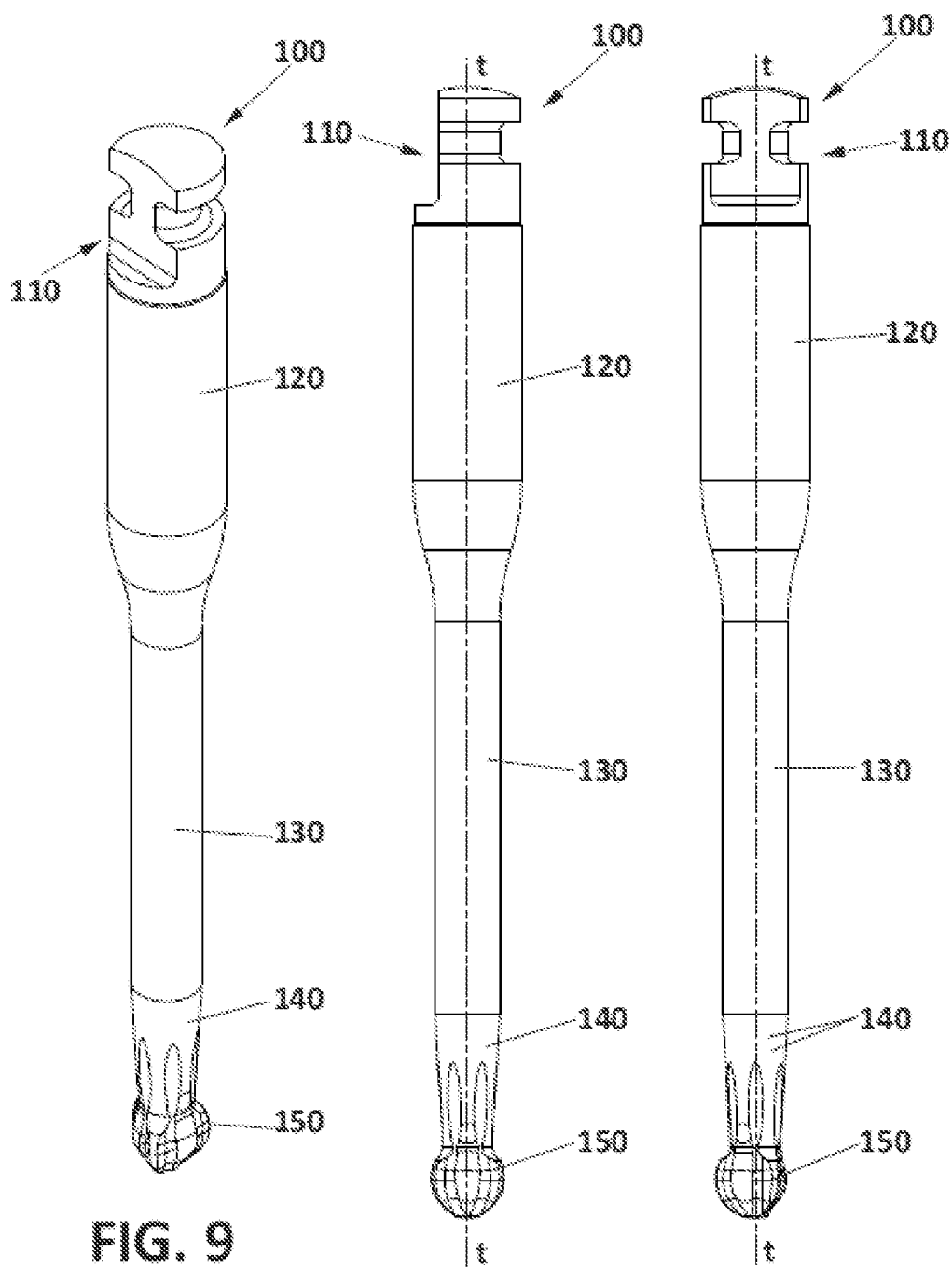
FIG. 9 shows a perspective view of a screwdriver.
FIGS. 10A-10B show two side views (10A, 10B) of the screwdriver of FIG. 9.

FIG. 9 shows a perspective view of the tip 150 of the screwdriver 100 where the main parts thereof are shown. Specifically, the apparently spherical configuration, i.e. with a spherical appearance, is shown, defined by curved walls 154 by way of first spherical spindles, separated from each other by depressions 151 also spherical and by way of second spindles and by projections 153, by way of third spherical spindles. The third spherical spindles 153 have a thickness less than the first spherical spindles 154, while the spherical depressions 151 have a thickness less than that of the third spherical spindles 153. The depressions 151 are preferably a continuation of recesses made in the lower end of the screwdriver rod to weaken the same and enable the screwdriver to be separated into two parts in the event that a certain torque is exceeded and the screw on which said torque is applied does not rotate. This prevents damage to the screw. The tip 150 of the screwdriver is stripped at the lower part with an end 152 which may have a conical, spherical or flat shape, although it is not essential for the development of the screwdriver.

Figure 11:
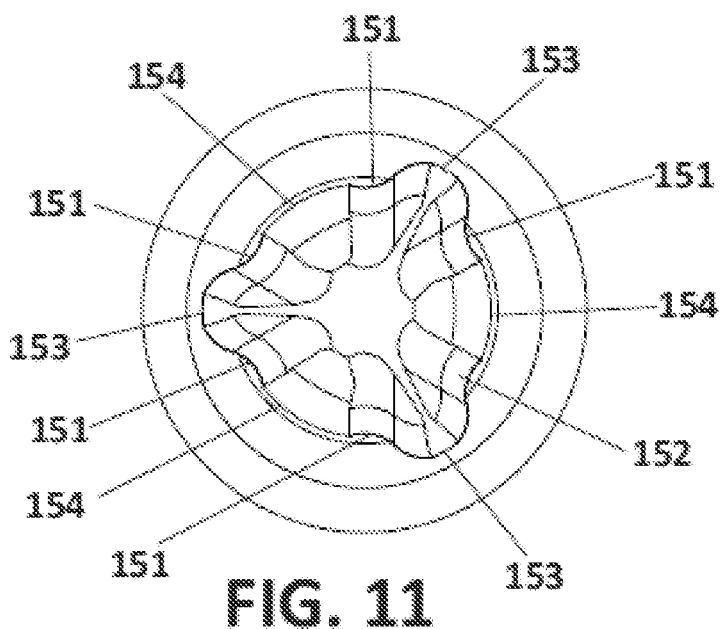
FIG. 11 shows a plan view of the screwdriver head.

FIG. 11 shows a bottom plan view of the head or tip 150 of the screwdriver 100 and the parts described above. The infinite transverse cross sections of the tip 150 have the same shape as the transverse cross section of the housing 14 of the screw, with the difference that in the case of the screwdriver said cross sections do not have the same surface as is preferable in the housing of the screw, but rather the different cross sections vary their surface according to the transverse plane determined by the cross section on the spherical tip 150. In FIGS. 14A-14E four transverse cross sections are shown according to the cutting planes of the tip 150. It is shown how the surface of the cross sections vary depending on the cutting plane. That is, each of the different transverse cross sections of the tip 150 of the screwdriver is governed by the same ratios as the housing 14 of the screw 10. The cross section of the tip 150 with a larger surface will preferably be slightly smaller than the surface of the cross section of the housing 14 of the screw 10 so that the tip 150 of the screwdriver 100 can penetrate the housing 14 of the screw.

Figure 12A:
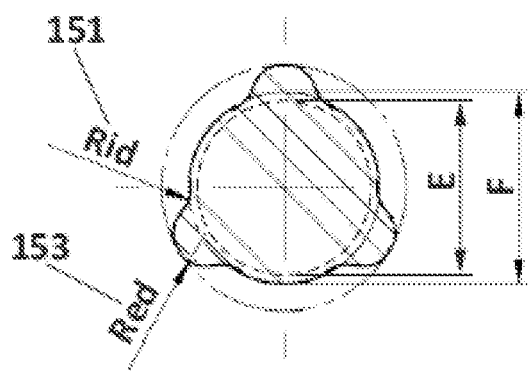
FIGS. 12A-12C show a screwdriver tip (12B), a transverse cross section (12A) thereof and a longitudinal cross section (12C) in which the different parts of the screw head are shown.
Figure 12B:
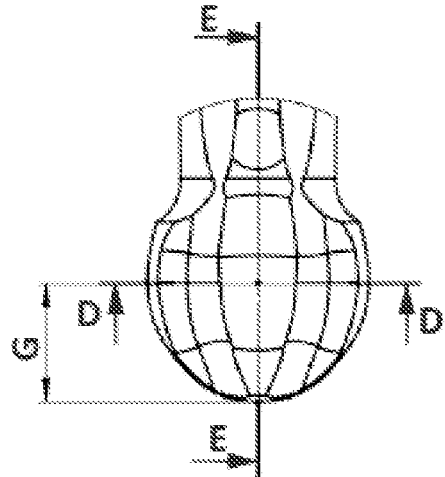
Figure 12C:
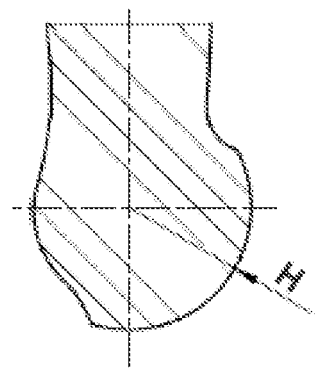

FIGS. 12A-12C shows a side view of the screwdriver tip, as well as a longitudinal cross section and a transverse cross section thereof wherein the parts and parameters that determine the geometry and shape of the screwdriver head are shown:

Red, which represents the radius of the three first outer arcs 153,
Rid, which represents the radius of the second arcs 151,
F, which represents the diameter of the first circumference of the screwdriver,
E, which represents the diameter of the third circumference of the screwdriver,
G, which represents the distance between the larger transverse cross section of the screwdriver head and the lower end of said head, and
H, which represents the outer radius on a longitudinal plane of the outer arc or projection 153.

Thus, the ratio between the parts and essential parameters that determine the geometry of the head or tip of the screwdriver to act with the screw head are:

A=1.14 F=1.17 E=6.4 Red=0.87 H

Figure 13:
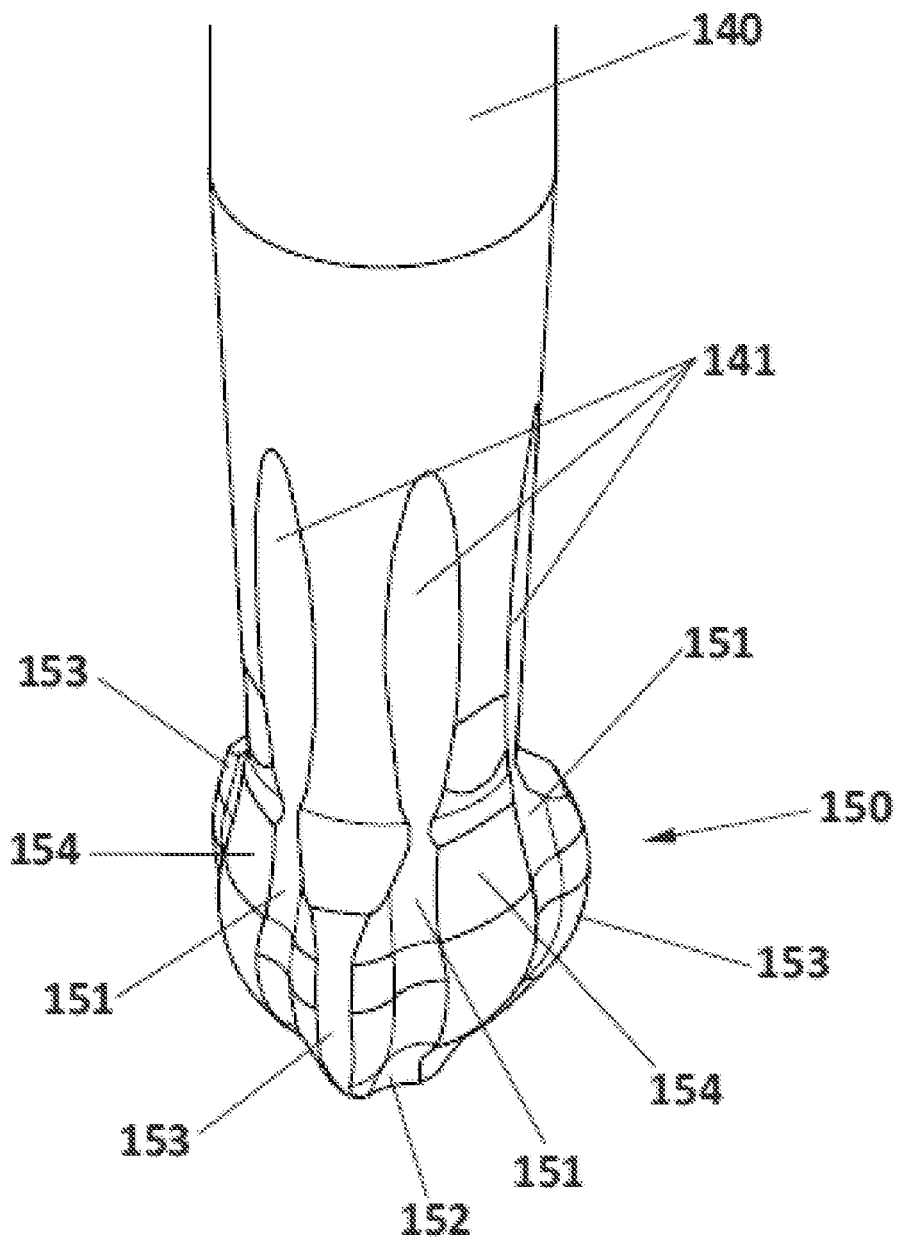
FIG. 13 shows a perspective view of an end of a screwdriver.
Figure 14A:
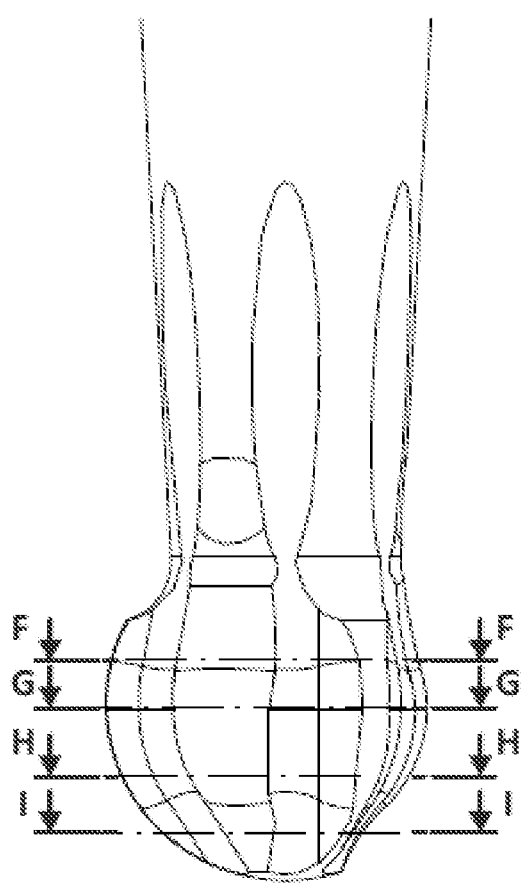
FIGS. 14A-14E show a side view (14A) of the screwdriver of FIG. 13 and four cross sections (14B, 14C, 14D, 14E) of the end of the screwdriver according to four transverse cutting planes.
Figure 14B:
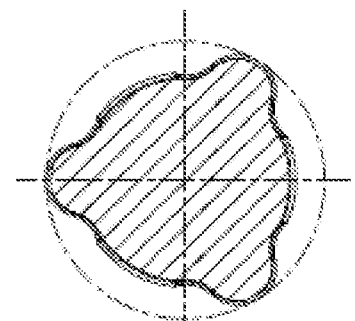
Figure 14C:
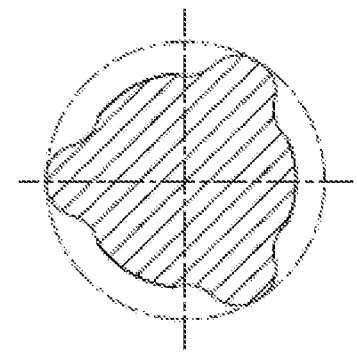
Figure 14D:
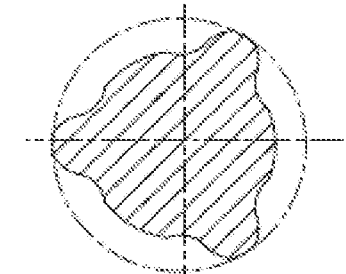
Figure 14E:
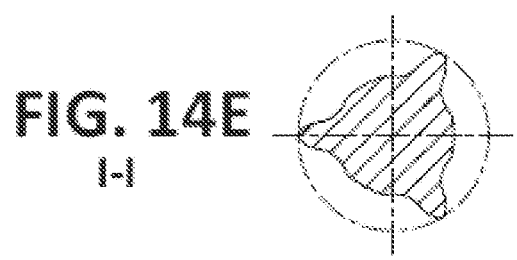

FIG. 13 shows a perspective detailed view of the screwdriver tip with the recesses 141, also shown in other figures, for reducing the cross section of the screwdriver above the tip and facilitate that the same is broken through that section. FIGS. 14A-14E shows successive cross sections of the screwdriver tip. The second arcs can have a radii that goes into the body of the tip.

The following figures, from 15 to 22, show couplings formed by a screw 10 and a screwdriver 100 according to the present invention, determining a coupling system.

Figure 15:
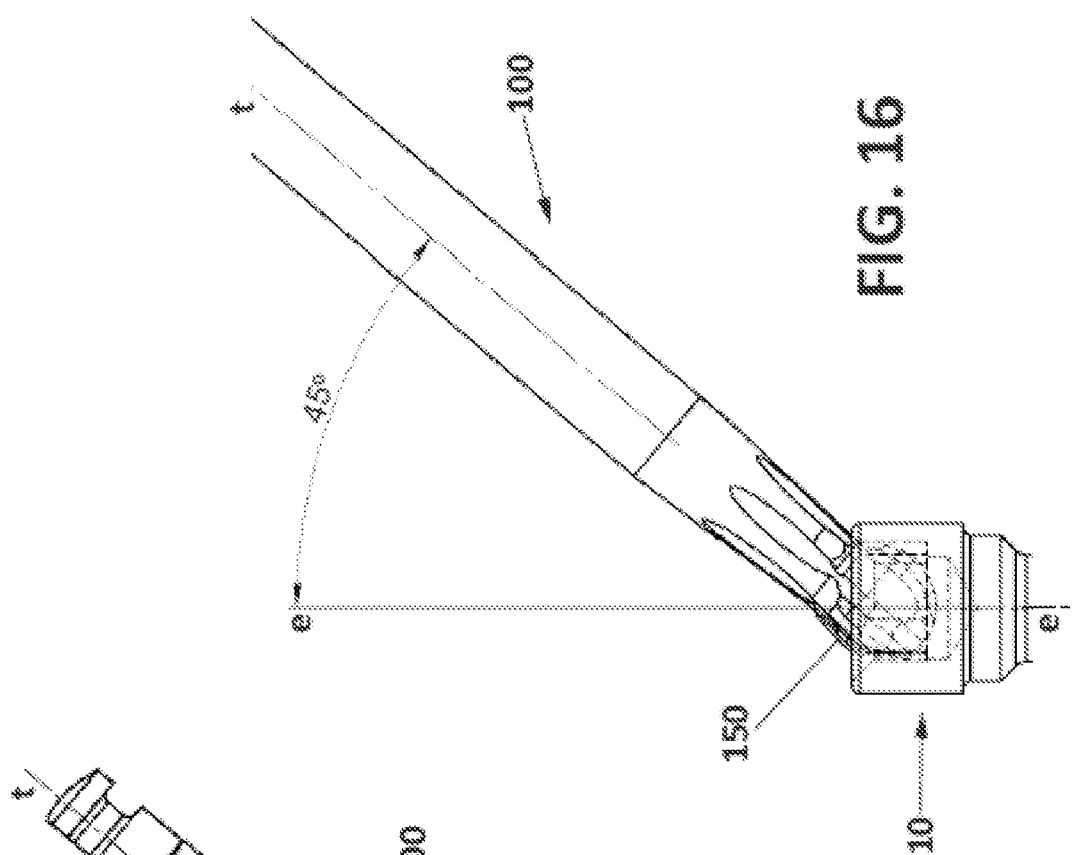
FIG. 15 shows a screwdriver with a 45° inclination on a screw.

In particular, FIG. 15 shows a screw 10 and a screwdriver 100 with an inclination of up to 45° between the longitudinal axis of the screw 10 and the longitudinal axis of the screwdriver 100. Said inclination can preferably reach up to 50°. Thus, the screwdriver can operate on the screw 10 in the entire range between 0° and 45°, and preferably up to 50°.

Figure 16:
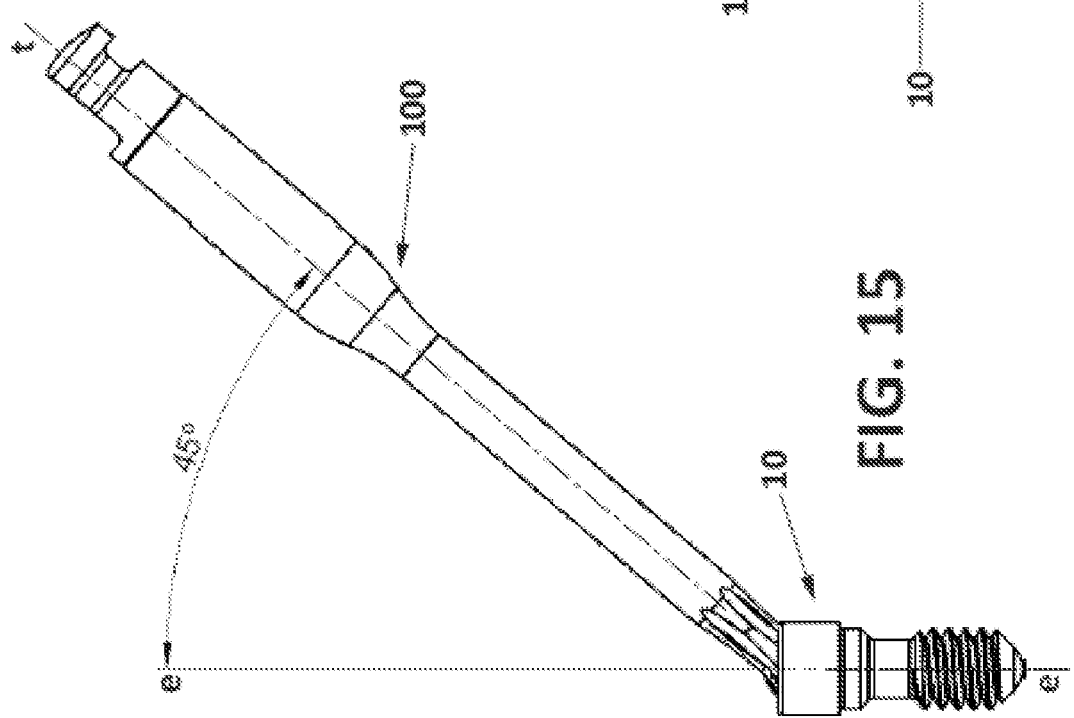
FIG. 16 shows a detailed view of the coupling area of FIG. 15.
Figures 17, 18:
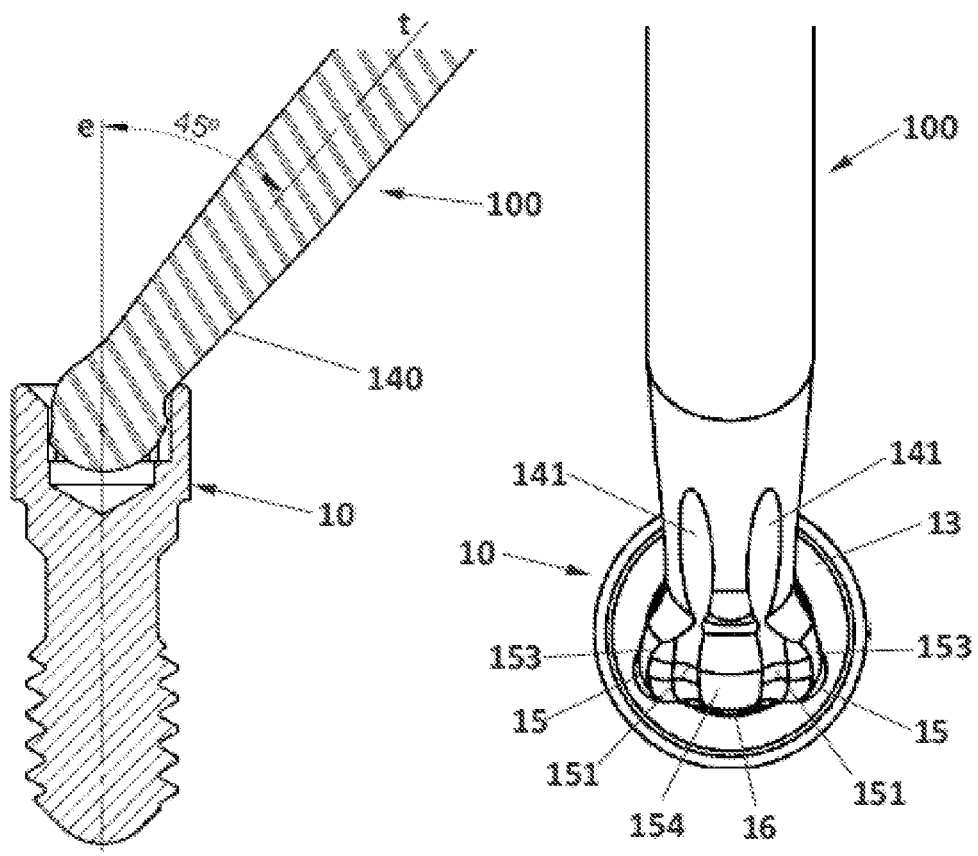
FIG. 17 shows a cross section of the coupling area of FIG. 16.
FIG. 18 shows an enlarged detailed view of the coupling of the screwdriver head in the hollow of the screw shown in FIGS. 15 to 17.
Figure 19:
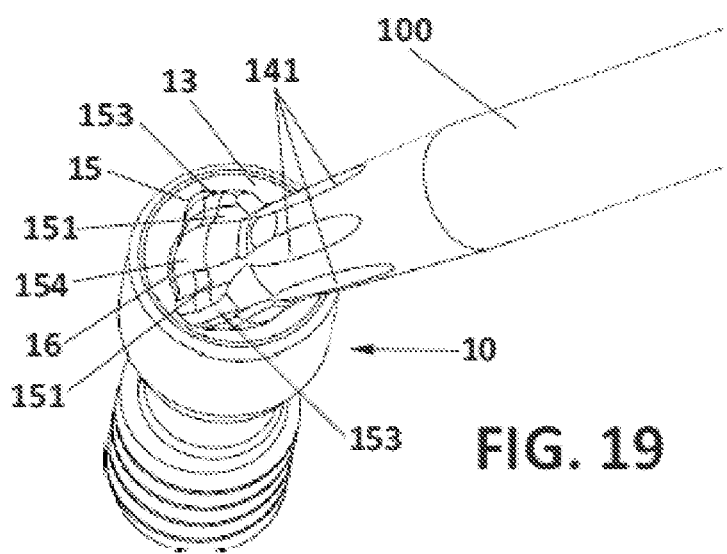
FIG. 19 shows a perspective view of the coupling of FIGS. 15 to 18.
Figure 20:
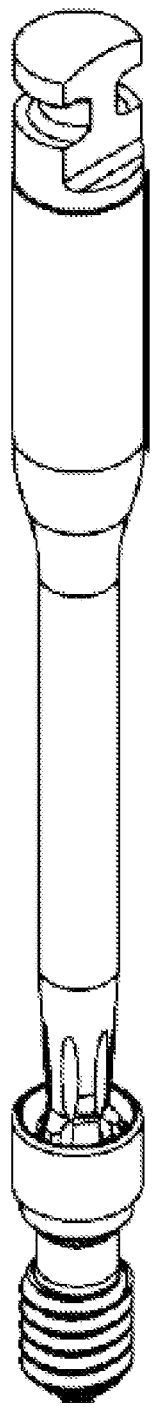
FIG. 20 shows a perspective view of a screwdriver without inclination (0° between axes) coupled to a screw.

FIG. 16 is an enlarged detailed view of FIG. 15 in which the tip 150 of the screwdriver 100 inside the housing 14 of the screw head 11 is also shown. A cross section of this FIG. 16 is shown in FIG. 17 where it is shown how the rod 140 of the screwdriver 100 rests on the inclined edge 13 of the housing 14 of the screw 10. FIG. 18 shows a top view of the previous coupling and FIG. 19 shows a perspective view of said coupling. FIG. 20 shows a perspective view of a longitudinal cross section of the mentioned coupling while FIG. 21 shows an elevation view of said longitudinal cross section.

Figure 21:
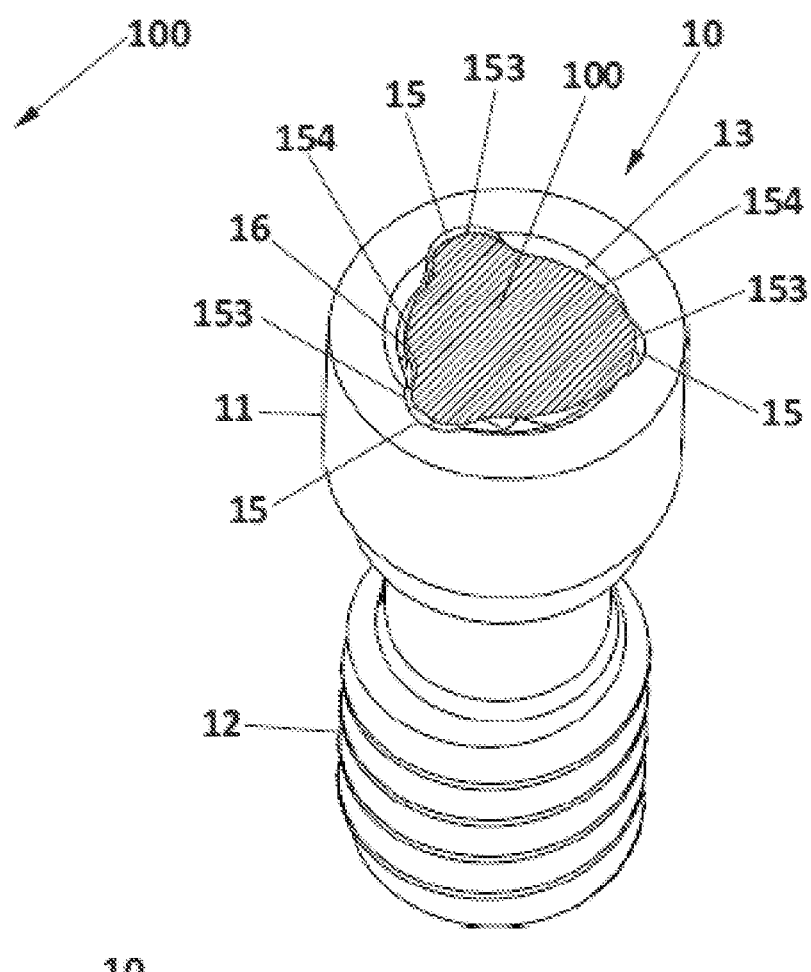
FIG. 21 shows a perspective view of the coupling of FIG. 20, with the screwdriver transversally cross-sectioned by its head and coupled to the screw.

FIGS. 20 and 21 show a screwdriver 100 on a screw 10, the longitudinal axis "e" of the screw 10 forming 0° with the longitudinal axis "t" of the screwdriver, i.e. both axes coinciding. FIG. 21 shows a cross section of the tip 150 of the screwdriver 100 where it can be seen how said cross section of the tip 150, according to the first embodiment of the screwdriver, coincides with the cross section of the housing 14 of the screw 10.

Figure 22:
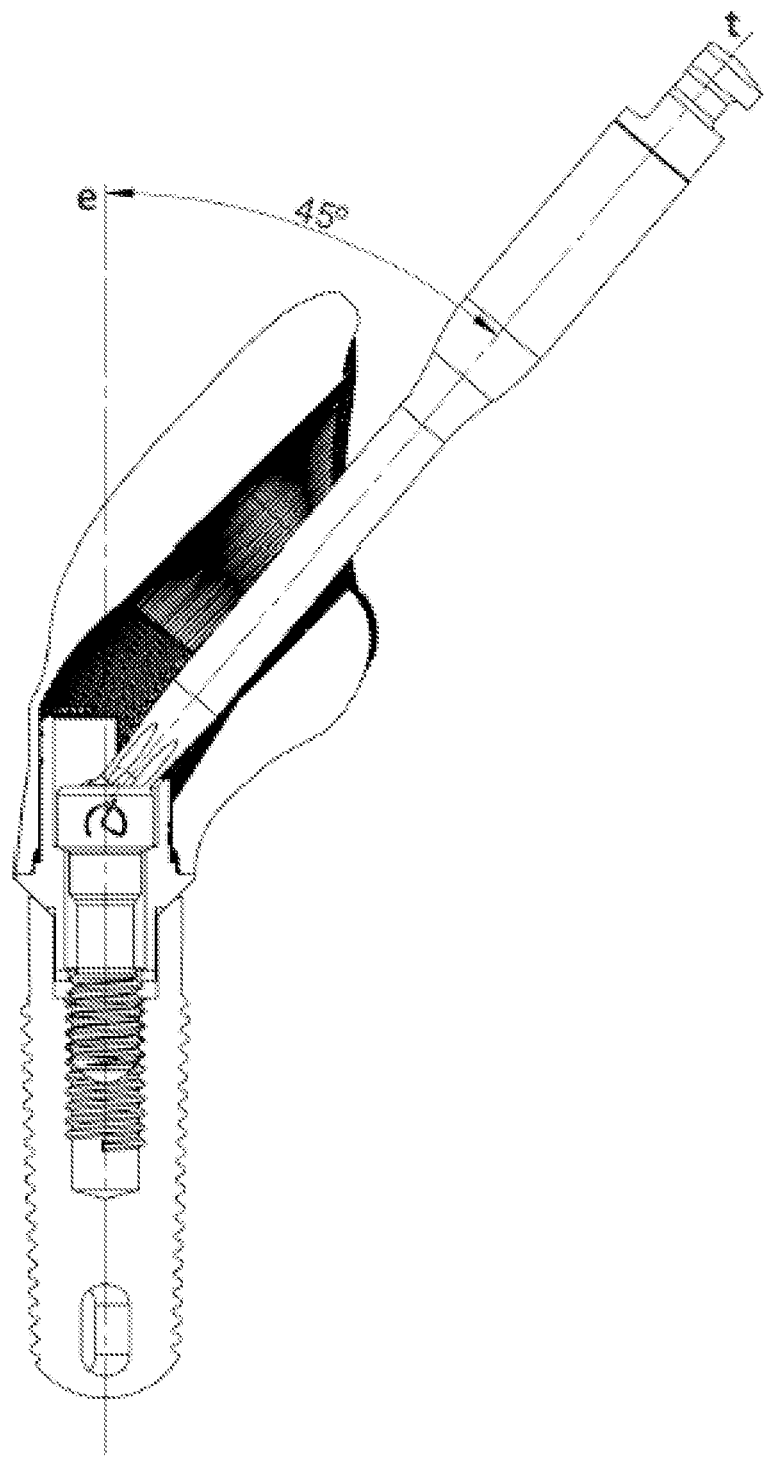
FIG. 22 shows a longitudinally cross-sectioned dental implant on which an intermediate element with a dental prosthesis is installed, said intermediate element being fastened to the dental implant by means of a screw and a screwdriver according to the present invention.
Figure 25A:
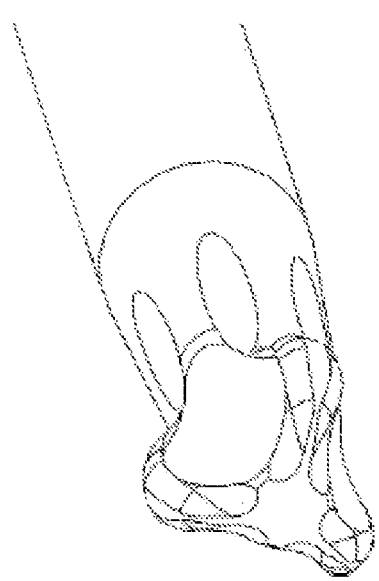
FIGS. 25A-25D show another alternative screwdriver tip, with a perspective view (25A), a bottom view (25B) of the tip and two side views (25C, 25D).
Figure 25B:
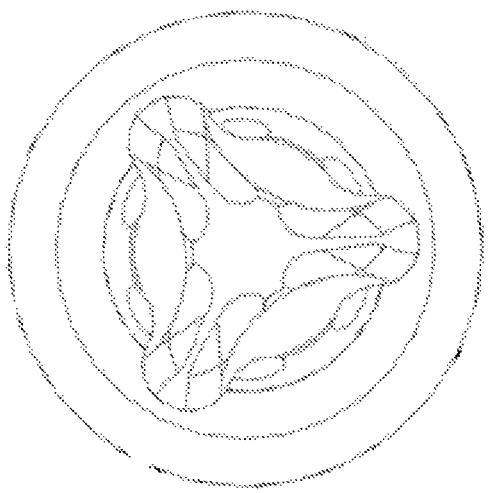
Figure 25C:
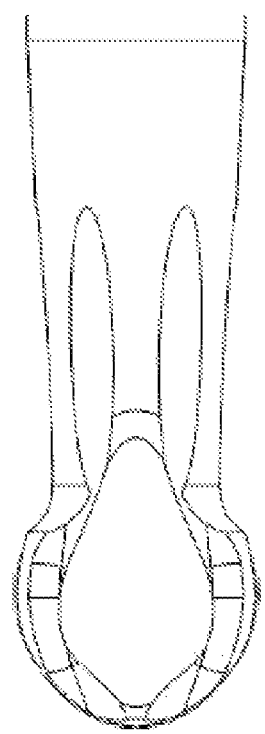
Figure 25D:
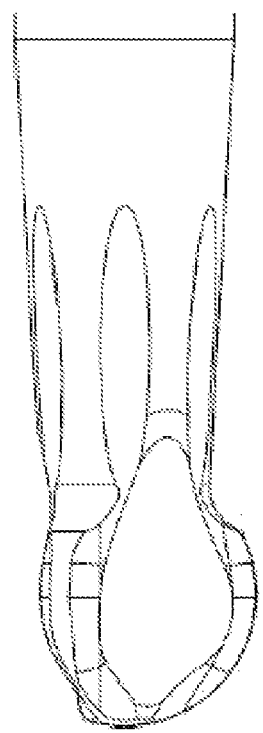

FIG. 22 shows a longitudinally cross-sectioned dental implant 200 on which an intermediate element 400 with a dental prosthesis 300 is installed, said intermediate element 400 being fastened to the dental implant 200 by means of a screw 10 and a screwdriver 100 according to the present invention. Due to the configuration of the screw 10 and the screwdriver, in particular due to the configuration of the housing 14 of the screw and of the tip 150 of the screwdriver, it is possible to act on the screw 10 with the screwdriver 100 when the dental prosthesis has a channel 310 with an inclination greater than 0°, and preferably up to 50°, in the figure, 45° with the axis "d" of the dental implant 200. Preferably said axis "d" of the dental implant 200 coincides with the axis "e" of the screw 10, such that the screwdriver will act on the screw with the inclination required by the inclination of the channel 310 of the prosthesis 300.

In the following FIGS. 23A-23C to 27A-27B, the tip does not show a first circumference F complementary to the first circumference A of the screw but alternative shapes that do not interfere with said first circumference A of the screw. On the contrary, the projections of the tip are inscribed in a second circumference. In these figures too, it can be seen that the diameter of the second arcs is different to the one of the previous embodiments, and can be even larger than the previous ones or smaller. Said second arcs could even disappear so that the first arcs could be joined to the area between them through sharp edges.

FIGS. 23A-23C shows a second exemplary embodiment of a screwdriver according to the present invention. Specifically, two side views and a plan view are shown, where it is shown that the area between the projections of the screwdriver tip is almost straight, that is to say, it would not adapt to the shape of the housing of the screw existing between the projections, such that only the projections of the screwdriver would come in contact with the projections of the hollow of the screw.

FIGS. 24A-24C shows a third exemplary embodiment of a screwdriver according to the present invention, wherein the area between the projections of the screwdriver tip is slightly curved and towards the inside of the tip.

FIGS. 25A-25D shows a fourth exemplary embodiment of a screwdriver according to the present invention, wherein the area between the projections of the screwdriver tip is curved and towards the inside of the tip in a more pronounced manner than in the previous figure.

Figure 26A:
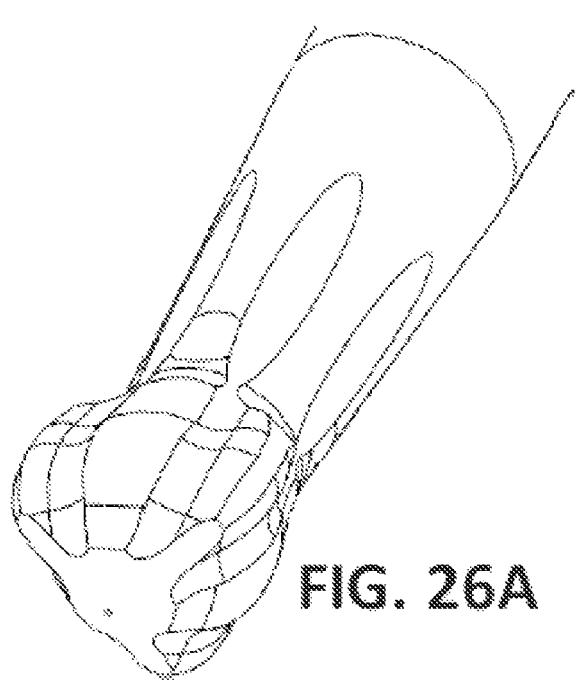
FIGS. 26A-26B show, in a perspective view (26A) and a side view (26B), another alternative screwdriver tip with a conical projection on its lower pole.
Figure 26B:
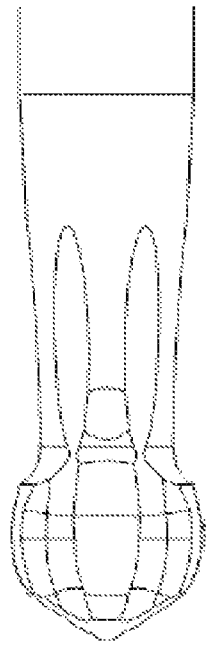

FIGS. 26A-26B shows a fifth exemplary embodiment of a screwdriver according to the present invention, similar to the screwdriver of the first embodiment, but with the lower pole thereof being pointed.

Figure 27A:
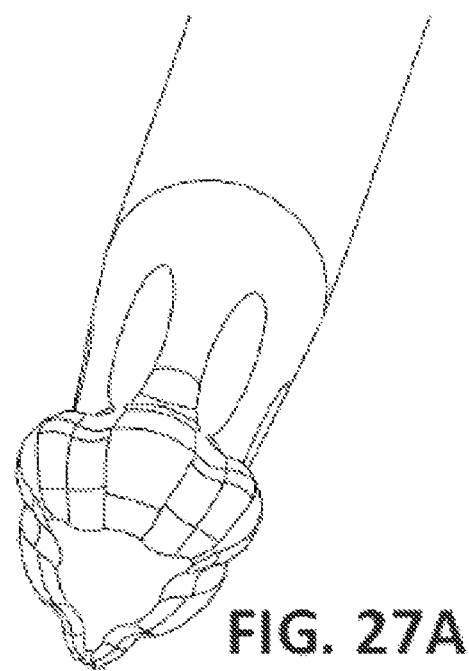
FIGS. 27A-27B show, in a perspective view (27A) and a side view (27B), another alternative screwdriver tip without a projection in the lower pole and with this plane.
Figure 27B:
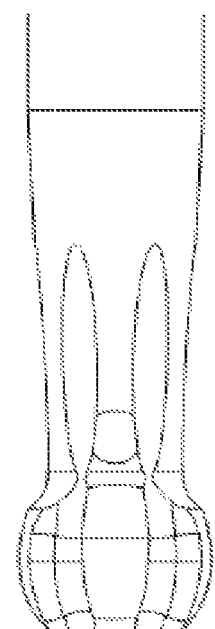

FIGS. 27A-27B shows a fifth exemplary embodiment of a screwdriver according to the present invention, similar to the screwdriver of the first embodiment, but with the lower pole thereof being flat.

The invention claimed is:

1. A dental prosthetic implant screw with a head at one end and a thread at the opposite end and configured to screw into a threaded housing of a dental implant, said head having a longitudinal central hollow with inner walls extending arallel to the longitudinal axis (e) of the screw wherein each of the inner walls has an axial length that is less than a diameter of a first circumference, a transverse cross section perpendicular to the longitudinal axis (e) of said hollow comprising:
   an opening of the hollow, having a shape determined by the first circumference with a first diameter and only three outer first arcs determining three lobes that increase the transverse area of the opening, the length of said three first arcs as measured along said arcs being shorter than the circumference of half-circle with the same radius as that of said three first arcs, and
   the three centres of each first arc located on a same third circumference, concentric to the first circumference, and said three centres being equidistant from each other.

2. The screw, according to claim 1, wherein
   the diameter of the third circumference is equal to 0.87 times the diameter of the first circumference, and
   the radius of the first arcs is equal to 0.19 times the diameter of the first circumference.

3. The screw, according to claim 1, wherein the length between the end of the wall at the bottom of the hollow and the outer surface of the screw head is equal to 0.68 times the diameter of the first circumference.

4. The screw, according to claim 2, wherein the distance between the beginning of the wall in the opening, side opposite to the bottom of the hollow, and the upper surface of the screw head, furthest from the end with the thread, is 0.20 times the diameter of the first circumference.

5. The screw, according to claim 3, wherein the surface between the beginning of the wall and the upper surface of the screw head is inclined/chamfered, between 30° and 60°.

6. The screw, according to claim 1, wherein, with respect to a longitudinal direction from the head of the screw, a length to an end of the hollow is less than a length to the thread that is opposite to the head.

7. A dental prosthetic implant comprising:
   a dental implant housing configured to be fixed to a jaw of a patient and comprising a threaded insert; and
   a dental prosthetic implant screw with a head at one end and a thread at the opposite end and configured to screw into a threaded housing of a dental implant, said head having a longitudinal central hollow with inner walls extending along the longitudinal axis (e) of the screw, a transverse cross section perpendicular to the longitudinal axis (e) of said hollow comprising:
   an opening of the hollow, having a shape determined by a first circumference with a first diameter and only three outer first arcs determining three lobes that increase the transverse area of the opening, the length of said three first arcs as measured along said arcs being shorter than the circumference of half-circle with the same radius as that of said three first arcs, and
   the three centres of each first arc located on a same third circumference, concentric to the first circumference, and said three centres being equidistant from each other.

8. The dental prosthetic implant according to claim 7, wherein
   the diameter of the third circumference is equal to 0.87 times the diameter of the first circumference, and
   the radius of the first arcs is equal to 0.19 times the diameter of the first circumference.

9. The dental prosthetic implant according to claim 7, wherein the length between the end of the wall at the bottom of the hollow and the outer surface of the screw head is equal to 0.68 times the diameter of the first circumference.

10. The dental prosthetic implant according to claim 7, wherein the distance between the beginning of the wall in the opening, side opposite to the bottom of the hollow, and the upper surface of the screw head, furthest from the end with the thread, is 0.20 times the diameter of the first circumference.

11. The dental prosthetic implant according to claim 7, wherein the surface between the beginning of the wall and the upper surface of the screw head is inclined/chamfered, between 30° and 60°.

* * * * *